(12) United States Patent
Scott

(10) Patent No.: US 10,344,672 B2
(45) Date of Patent: *Jul. 9, 2019

(54) LOW WEIGHT NOSE CONE ASSEMBLY

(71) Applicant: Rolls-Royce Corporation, Indianapolis, IN (US)

(72) Inventor: Matthew A. Scott, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 187 days.

This patent is subject to a terminal disclaimer.

(21) Appl. No.: 15/342,486

(22) Filed: Nov. 3, 2016

(65) Prior Publication Data

US 2018/0119615 A1    May 3, 2018

(51) Int. Cl.

| F01D 5/02 | (2006.01) |
| F02C 7/04 | (2006.01) |
| B64C 11/14 | (2006.01) |
| F02C 7/20 | (2006.01) |
| F03B 1/02 | (2006.01) |
| F03D 1/06 | (2006.01) |

(Continued)

(52) U.S. Cl.
CPC .............. F02C 7/04 (2013.01); B64C 11/14 (2013.01); F02C 7/20 (2013.01); F03B 1/02 (2013.01); F03D 1/0691 (2013.01); F04D 29/329 (2013.01); F04D 29/38 (2013.01); F04D 29/644 (2013.01); F05D 2220/31 (2013.01); F05D 2220/32 (2013.01); F05D 2230/60 (2013.01); F05D 2260/33 (2013.01); Y02E 10/721 (2013.01); Y02T 50/672 (2013.01)

(58) Field of Classification Search
CPC .... F02C 7/04; F02C 7/00; F02C 7/047; F02C 7/20; F02K 3/06; B64C 11/14; F05D 2200/221; Y02T 50/672; Y02E 10/70; Y02E 10/72; Y02E 10/721; F42B 10/46; B63H 1/20; B63H 1/28; B29C 65/00; B29C 66/00; B29C 69/00
USPC ......................................................... 415/144
See application file for complete search history.

(56) References Cited

U.S. PATENT DOCUMENTS 3,799,693 A    3/1974 Hull
4,449,737 A *  5/1984 Specht .................. F16L 37/008
                                                      285/192

(Continued)

FOREIGN PATENT DOCUMENTS

GB    2459366 A    10/2009

OTHER PUBLICATIONS

European Patent Office, Extended European Search Report for corresponding EP Application No. 17194575 dated Mar. 9, 2018, 1pg.

*Primary Examiner* — David E Sosnowski
*Assistant Examiner* — Maranatha Boardman
(74) *Attorney, Agent, or Firm* — Duane Morris LLP

(57) ABSTRACT

Systems and methods of coupling a nose cone to a turbine machine. Nose cone assembly weight and coupling difficulty are each reduced by reducing or eliminating the number of bolts used to mount the nose cone to the turbine machine, as well as the support or retaining ring. The disclosed nose cone comprises a plurality of hub mounting elements including one or more bayonet flanges, two or more apertures defined by a flange forming an annular hub mating surface of the nose cone and configured to receive an fastener therethrough, and one or more pilot flanges.

20 Claims, 24 Drawing Sheets

(51) Int. Cl.
    *F04D 29/32*     (2006.01)
    *F04D 29/38*     (2006.01)
    *F04D 29/64*     (2006.01)
    *F01D 25/24*     (2006.01)

(56) References Cited

U.S. PATENT DOCUMENTS

| | | | |
|---|---|---|---|
| 4,863,354 | A | 9/1989 | Asselin et al. |
| 5,573,378 | A * | 11/1996 | Barcza ................... B64C 11/14 |
| | | | 411/175 |
| 6,447,255 | B1 * | 9/2002 | Bagnall ................... F01D 5/066 |
| | | | 277/626 |
| 7,303,377 | B2 * | 12/2007 | Rockarts ................. F01D 5/027 |
| | | | 416/144 |
| 7,306,432 | B2 | 12/2007 | Rockarts et al. |
| 8,092,183 | B2 * | 1/2012 | Borzakian ............... F01D 5/027 |
| | | | 416/219 R |
| 8,215,910 | B2 | 7/2012 | Belmonte et al. |
| 8,616,854 | B2 | 12/2013 | Mahan |
| 8,985,952 | B2 | 3/2015 | Belmonte et al. |
| 9,132,908 | B1 | 9/2015 | Grip et al. |
| 9,540,939 | B2 * | 1/2017 | Maliniak ................... F02C 7/04 |
| 2010/0260605 | A1 * | 10/2010 | MacFarlane ............ F01D 5/027 |
| | | | 416/144 |
| 2013/0323063 | A1 | 12/2013 | Patsouris et al. |
| 2015/0047191 | A1 | 2/2015 | Rosenau et al. |
| 2015/0267614 | A1 | 9/2015 | Merlot |

\* cited by examiner

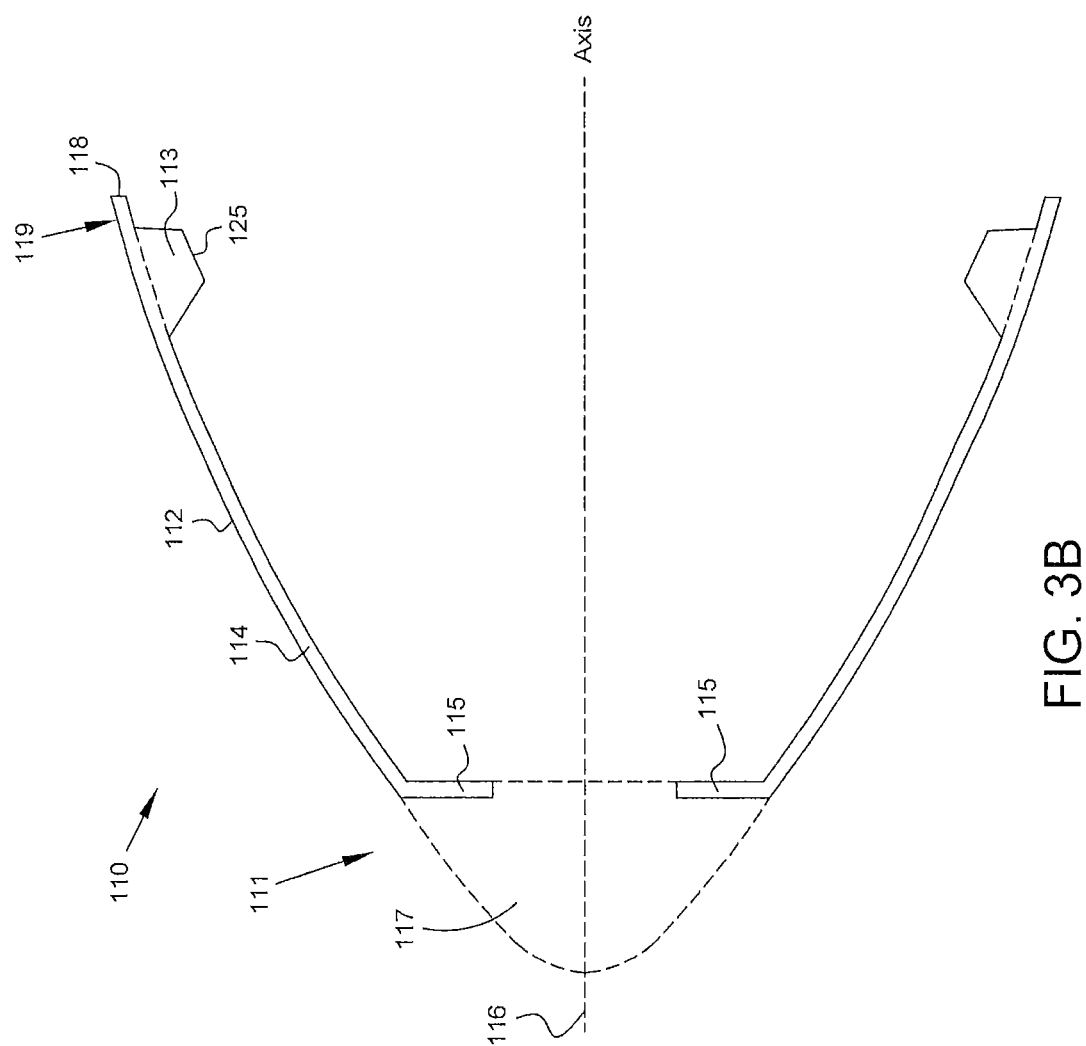

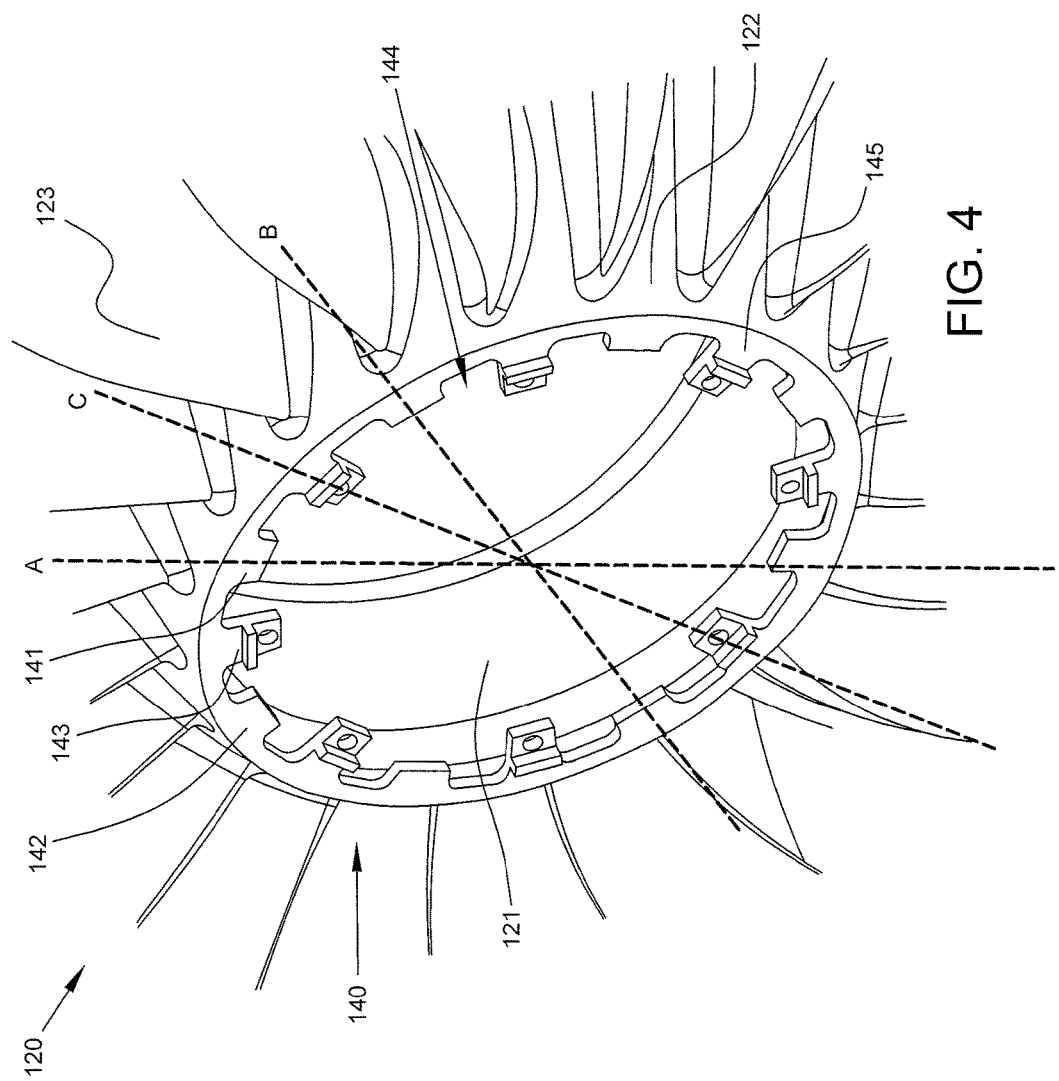

LOW WEIGHT NOSE CONE ASSEMBLY

RELATED APPLICATIONS

This application is related to concurrently filed and co-pending applications U.S. patent application Ser. No. 15/342,446 entitled "Nose Cone Assembly Without Fasteners"; and U.S. patent application Ser. No. 15/342,526 entitled "Snap Fit Nose Cone Assembly." The entirety of these applications are incorporated herein by reference.

FIELD OF THE DISCLOSURE

The present disclosure relates generally to turbine machines, and more specifically to a nose cone assembly for a turbine machine.

BACKGROUND

Turbine machines provide energy for a wide range of uses. A turbine machine comprises at least a rotatable shaft and a plurality of blades. In some applications the plurality of blades comprise a fan. Examples of turbine machines include turbofan, turbojet, turboshaft, and turboprop engines; gas turbine engines; and wind turbines.

The energy produced by a turbine machine is generally either electrical or mechanical. As one example, turbine machines are used to provide propulsion to an aircraft. A typical turbine engine comprises a compressor, a combustor, a high-pressure turbine, and a low-pressure turbine.

In some turbine machines, particularly in turbine engines used for aircraft applications, it is desirable to attach a nose cone upstream from the plurality of blades of the turbine machine. Nose cones are sometimes referred to in the art as "intake cones," "inlet cones," "nose cowls," or "spinners." The nose cone can serve to reduce drag caused by the turbine machine, improve air flow to the plurality of blades, and avoid or limit damage potentially caused by impinging foreign objects. In supersonic aircraft, a nose cone is also advantageously used to slow the flow of air from supersonic flight speed to a subsonic speed before it enters the turbine machine.

As described below with reference to FIGS. 1A and 1B, the mounting of a nose cone to the turbine machine typically requires bolting the base of the nose cone to a support ring or retaining ring. The addition of a support or retaining ring and the use of a plurality of bolts to secure the nose cone increases the weight of the turbine machine, which is undesirable as it may negatively impact turbine efficiency. Further, positioning, bolting, and balancing the nose cone is a time- and labor-intensive process. Balancing the nose cone and turbine machine is necessary to address an uneven weight distribution, and typically involves attaching balance weights to the nose cone, fan, shaft, or other part of the turbine machine. However, small turbofan engines typically have limited space to accommodate balance weights and attachment features for nose cones.

FIG. 1 is a partial sectional view of a nose cone 10 connected to a fan rotor 12 of an inlet fan of a gas turbine engine in accordance with conventional methods as described in U.S. Patent Application Publication No. 2011/0236217. The illustrated nose cone 10 comprises a flange member 14 which tapers to a leading cone tip (not shown) and a region proximate the trailing edge 16 having a radial thickness greater than that of the remainder of the flange member 14. A support ring 18 having an axially-extending flange 20 is connected to the fan rotor 12. A bolt 22 engages the trailing edge 16 of nose cone 10 to an axial member 24 and support ring 18. One disadvantage of the configuration shown in FIG. 1 and similar nose cone mounting configurations used in the art is that the trailing edge 16 must be reinforced by increasing the thickness of the nose cone 10, which increases the weight of the nose cone 10 as well. Another disadvantage is the difficulty encountered when mounting the nose cone 10 to support ring 18, particularly when bolting the nose cone 10 to the support ring 18.

Another nose cone configuration is illustrated in FIG. 2. FIG. 2 is a partial sectional view of a nose cone 10 connected to an inlet fan of a gas turbine engine as described in U.S. Pat. No. 8,540,492. As illustrated in FIG. 2, a nose cone 10 comprises a flange member 14 which axially extends from leading cone tip (not shown) to a trailing edge 13. A radially thick mounting ring 26 is formed proximate the trailing edge 13. The mounting ring 26 defines a plurality of apertures 15 that are spaced apart about the circumference of the mounting ring 26. One or more of the apertures may include a recessed portion 17 for holding one or more balance weights 19. A fan rotor 12 is connected to retaining ring 28 having a mounting flange 30. A bolt 22 extends through an aperture 15 to connect nose cone 10 to the mounting flange 30. The bolt 22 also retains balance weight 19 within the recessed portion 17. As can be appreciated, the one or more balance weights 19 may be added or removed from recessed portions 17 without dismounting the nose cone 10 from the mounting flange 30.

As with FIG. 1, the nose cone 10 of FIG. 2 can be time- and labor-intensive to properly position, secure, and balance when installing. The many bolts 22 required around the circumference of the flange member 14, as well as the inclusion of retaining ring 28 in the assembly, can substantially increase the weight of the turbine machine.

It is therefore desired in the art to have improvements to nose cones and nose cone assemblies for turbine machines which reduce the overall weight of the turbine machine and simplify the process of coupling the nose cone to the turbine machine.

SUMMARY

The present application discloses one or more of the features recited in the appended claims and/or the following features which, alone or in any combination, may comprise patentable subject matter.

According to an aspect of the present disclosure, a nose cone configured to be mounted to a hub in a turbo machine comprises a flange extending radially around a central axis and axially from an apex portion of the nose cone to a base portion of the nose cone, the flange forming an annular hub mating surface at the base portion and having an outer surface defining an air flow path; and a plurality of hub mounting elements each comprising one or more flexible spring flanges disposed around the circumference of the base portion, each of the flexible spring flanges forming a hub engaging surface parallel to and facing in the same direction as the hub mating surface; and one or more bayonet flanges disposed around the circumference of the base portion, each of the bayonet flanges forming a hub engaging surface parallel to and facing in the opposite direction as the hub mating surface. In some embodiments the nose cone further comprises one or more pilot flanges disposed around the circumference of the base portion, each of the pilot flanges forming a hub engaging surface perpendicular to the hub mating surface.

In some embodiments the nose cone comprises an annular mounting member extending radially inward from the flange proximate the hub mating surface, the bayonet flanges and the pilot flanges extending axially from the mounting member. In some embodiments the flexible spring flanges extend radially inward from the hub mating surface. In some embodiments the flexible spring flanges comprise a feature that extends axially beyond the plane of the hub mating surface. In some embodiments the flexible spring flanges extend radially inward from the hub mating surface. In some embodiments the flexible spring flanges comprise a feature that extends axially beyond the plane of the hub mating surface. In some embodiments the flange forming an annular hub mating surface defines a plurality of apertures each configured to receive a balancing weight and balancing weight fastener therein. In some embodiments each of the one or more flexible spring flanges is removably attached to the nose cone.

According to another aspect of the present disclosure, a nose cone assembly in a turbo machine comprises a turbo machine component comprising an annular hub extending radially around a central axis and forming a planar mounting surface, the hub comprising one or more bayonet retainers disposed around the circumference of the hub, the bayonet retainers extending radially inward from the hub and forming an engagement surface parallel to and facing the opposite direction as the mounting surface; one or more spring flange mating surfaces disposed around the circumference of the hub, the mating surfaces extending radially inward from the hub and forming an engagement surface parallel to and facing the same direction as the mounting surface; one or more pilot guides disposed around the circumference of the hub, the pilot guides extending radially inward from the hub and forming an engagement surface perpendicular to the mounting surface; and a nose cone mounted on the hub, the nose cone comprising a flange extending radially around the central axis and axially from an apex portion of the nose cone to a base portion of the nose cone, the flange forming an annular hub mating surface at the base portion and having an outer surface defining an air flow path; and a plurality of hub mounting elements comprising one or more flexible spring flanges disposed around the circumference of the base portion, each of the flexible spring flanges forming a hub engaging surface parallel to and facing in the same direction as the hub mating surface and being engaged with a respective engagement surface of a spring flange mating surface disposed on the hub; one or more bayonet flanges disposed around the circumference of the base portion, each of the bayonet flanges forming a hub engaging surface parallel to and facing in the opposite direction as the hub mating surface and being engaged with a respective engagement surface of a bayonet retainer disposed on the hub; and one or more pilot flanges disposed around the circumference of the base portion, each of the pilot flanges forming a hub engaging surface perpendicular to the hub mating surface and being engaged with a respective engagement surface of a pilot guide disposed on the hub.

In some embodiments the planar mounting surface is the axially forwardmost extension of the hub. In some embodiments the hub comprises a plurality of blades extending, radially outward from a rotor. In some embodiments the engagement of the hub engaging surface of the flexible spring flange with the spring flange mating surface of the hub results in deflection of the flexible spring flange. In some embodiments the deflection of the flexible spring flange imparts an axially opposing force between the nose cone and the hub. In some embodiments each of the one or more pilot guides define an aperture configured to receive a balancing weight. In some embodiments the nose cone assembly further comprises a balancing weight secured to the pilot guide by a fastener. In some embodiments the nose cone assembly further comprises an annular mounting member extending radially inward from the nose cone flange proximate the hub mating surface, the bayonet flanges and the pilot flanges extending axially from the mounting member. In some embodiments the flexible spring flanges extend radially inward from the hub mating surface.

According to another aspect of the present disclosure, a method is disclosed of coupling a nose cone to a hub in a turbo machine having a central axis, the nose cone comprising a plurality of hub mounting elements disposed around a circumference of the nose cone base, the hub mounting elements including one or more flexible spring flanges, one or more bayonet flanges, and one or more pilot flanges; and the hub comprising a plurality of nose cone retention elements disposed proximate a planar mounting surface, the plurality of nose cone retention elements comprising one or more spring flange mating surfaces, one or more bayonet retainers, and one or more pilot guides; wherein the method comprises positioning the nose cone axially forward of and concentric with the hub; moving the nose cone in an axially aft direction until at least a portion of the one or more bayonet flanges is disposed axially aft of a respective one or more bayonet retainers; and rotating the nose cone to engage the one or more flexible spring flange and a respective spring flange mating surface and to engage the one or more bayonet flange and a respective bayonet retainer.

In some embodiments the step of rotating the nose cone further engages the one or more pilot flanges and a respective pilot guide. In some embodiments the engagement of the one or more flexible spring flange with a respective spring flange mating surface results in deflection of the flexible spring flange, and wherein the deflection imparts an axially opposing force between the nose cone and the hub.

According to another aspect of the present disclosure, a nose cone configured to be mounted to a hub in a turbo machine comprises a flange extending radially around a central axis and axially from an apex portion of the nose cone to a base portion of the nose cone, the flange forming an annular hub mating surface at the base portion and having an outer surface defining an air flow path; and a plurality of hub mounting elements comprising: one or more bayonet flanges disposed around the circumference of the base portion, each of the bayonet flanges forming a hub engaging surface parallel to and facing in the opposite direction as the hub mating surface; and two or more apertures defined by the flange forming the annular hub mating surface, each of the apertures configured to receive an fastener therethrough. In some embodiments the nose cone further comprises one or more pilot flanges disposed around the circumference of the base portion, each of the pilot flanges forming a hub engaging surface perpendicular to the hub mating surface.

In some embodiments the nose cone comprises an annular mounting member extending radially inward from the flange proximate the hub mating surface, the bayonet flanges and the pilot flanges extending axially from the mounting member. In some embodiments each of the two or more apertures include a countersink configured to receive a balance weight. In some embodiments each of the two or more apertures pass through the annular mounting member. In some embodiments each hub engaging surface of the one or more bayonet flanges comprises a radially tapered surface. In some embodiments the radially tapered surface comprises a parabolic taper.

In some embodiments the flange forming an annular hub mating surface defines a plurality of apertures each configured to receive a balancing weight and balancing weight fastener therein. In some embodiments the flange extending radially around the central axis forms a parabolic outer surface of the nose cone. In some embodiments the flange extending radially around the central axis forms a frustoconical outer surface of the nose cone.

According to another aspect of the present disclosure, a nose cone assembly in a turbo machine comprises a turbo machine component comprising an annular hub extending radially around a central axis and forming a planar mounting surface, the hub comprising: one or more bayonet retainers disposed around the circumference of the hub, the bayonet retainers extending radially inward from the hub and forming an engagement surface parallel to and facing the opposite direction as the mounting surface; two or more mounting flanges disposed around the circumference of the hub, each of the mounting flanges extending axially forward from the planar mounting surface and defining an aperture configured to receive a fastener; and one or more pilot guides disposed around the circumference of the hub, the pilot guides extending radially inward from the hub and forming an engagement surface perpendicular to the mounting surface; and a nose cone mounted on the hub, the nose cone comprising a flange extending radially around the central axis and axially from an apex portion of the nose cone to a base portion of the nose cone, the flange forming an annular hub mating surface at the base portion and having an outer surface defining an air flow path; and a plurality of hub mounting elements comprising: one or more bayonet flanges disposed around the circumference of the base portion, each of the bayonet flanges forming a hub engaging surface parallel to and facing in the opposite direction as the hub mating surface and being engaged with a respective engagement surface of a bayonet retainer disposed on the hub; two or more apertures defined by the flange forming the annular hub mating surface, each of the apertures configured to receive a fastener therethrough and being engaged with the aperture of a respective one of the mounting flanges by the fastener; and one or more pilot flanges disposed around the circumference of the base portion, each of the pilot flanges forming a hub engaging surface perpendicular to the hub mating surface and being engaged with a respective engagement surface of a pilot guide disposed on the hub.

In some embodiments the nose cone assembly further comprises two or more fasteners, each fastener secured through a respective one of the one or more apertures defined by the flange forming the annular hub mating surface and of the one or more apertures defined by the mounting flange. In some embodiments the one or more apertures defined by the flange forming the annular hub mating surface each include a countersink configured to receive a balance weight. In some embodiments each of the one or more pilot guides define an aperture configured to receive a balancing weight. In some embodiments the nose cone assembly further comprises a balancing weight secured to the pilot guide by a fastener. In some embodiments the nose cone assembly further comprises an annular mounting member extending radially inward from the nose cone flange proximate the hub mating surface, the bayonet flanges and the pilot flanges extending axially from the mounting member. In some embodiments the hub comprises a plurality of blades extending radially outward from a rotor.

According to another aspect of the present disclosure, a method of coupling a nose cone to a hub in a turbo machine having a central axis, the nose cone comprising a plurality of hub mounting elements disposed around a circumference of the nose cone base, the hub mounting elements including one or more bayonet flanges and one or more pilot flanges, the nose cone defining two or more nose cone apertures proximate the nose cone base; and the hub comprising a plurality of nose cone retention elements disposed proximate a planar mounting surface, the plurality of nose cone retention elements comprising one or more bayonet retainers, one or more pilot guides, and two or more mounting flanges each defining a respective mounting flange aperture; wherein the method comprises: positioning the nose cone axially forward of and concentric with the hub; moving the nose cone in an axially aft direction until at least a portion of the one or more bayonet flanges is disposed axially aft of a respective one or more bayonet retainers; and rotating the nose cone to engage the one or more bayonet flange and a respective bayonet retainer and to align each of the two or more apertures defined by the nose cone with a respective one of the two or more apertures defined by the mounting flange.

In some embodiments the method further comprises securing the nose cone to the hub by securing a fastener through one of the nose cone apertures and a corresponding one of the mounting flange apertures. In some embodiments the step of rotating the nose cone further engages the one or more pilot flanges and a respective pilot guide.

According to another aspect of the present disclosure, a nose cone configured to be mounted to a hub in a turbo machine comprises: a flange extending radially around a central axis and axially from an apex portion of the nose cone to a base portion of the nose cone, the flange forming an annular hub mating surface at the base portion and having an outer surface defining an air flow path; and a plurality of hub mounting elements disposed around the circumference of the base portion, each of the hub mounting elements comprising a flexible flange extending toward the central axis and having a ridge protruding from a radially outward facing surface; wherein the flexible flange is configured to deflect toward the central axis upon engagement with the hub.

In some embodiments the flexible flange extends axially beyond the hub mating surface. In some embodiments the nose cone comprises an annular mounting member extending radially inward from the flange proximate the hub mating surface, the flexible flanges extending axially from the mounting member. In some embodiments the flexible flange extends axially beyond the hub mating surface.

In some embodiments the flange extending radially around the central axis forms a parabolic outer surface of the nose cone. In some embodiments the flange extending radially around the central axis forms a frustoconical outer surface of the nose cone. In some embodiments the nose cone further comprises two or more apertures defined by the flange forming the annular hub mating surface, each of the apertures configured to receive an fastener therethrough. In some embodiments each of the two or more apertures include a countersink configured to receive a balance weight. In some embodiments a leading edge of the flexible flange is chamfered. In some embodiments the nose cone further comprises a circumferential alignment flange extending axially from the flange forming the annular hub mating surface. In some embodiments the nose cone further comprises a circumferential alignment flange extending axially from the mounting member.

According to another aspect of the present disclosure, a nose cone assembly in a turbo machine comprises a turbo machine component comprising an annular hub extending radially around a central axis and forming a planar mounting surface, the hub comprising one or more mounting portions disposed around the circumference of the hub, the mounting portions extending radially inward from the hub and forming a mounting surface which defines a groove and a nose cone mounted on the hub, the nose cone comprising a flange extending radially around the central axis and axially from an apex portion of the nose cone to a base portion of the nose cone, the flange forming an annular hub mating surface at the base portion and having an outer surface defining an air flow path; and a plurality of hub mounting elements disposed around the circumference of the base portion, each of the hub mounting elements comprising a flexible flange extending toward the central axis and having a ridge protruding from a radially outward facing surface, wherein the flexible flange is configured to deflect toward the central axis upon engagement with the hub, and wherein each ridge is engaged with a groove of a respective one of the one or more mounting portions.

In some embodiments the nose cone assembly further comprises two or more mounting flanges disposed around the circumference of the hub, each of the mounting flanges extending axially forward from the planar mounting surface and defining an aperture configured to receive a fastener; and two or more apertures defined by the flange forming the annular hub mating surface, each of the apertures configured to receive a fastener therethrough and being engaged with the aperture of a respective one of the mounting flanges by the fastener.

In some embodiments the one or more apertures defined by the flange forming the annular hub mating surface each include a countersink configured to receive a balance weight. In some embodiments the mounting surface further defines a guide channel proximate the groove. In some embodiments the nose cone further comprises an alignment flange abutting an alignment tab of the hub. In some embodiments an engaged position of the flexible flange is inwardly deflected relative to an unengaged position. In some embodiments the hub comprises a plurality of blades extending radially outward from a rotor.

According to yet another aspect of the present disclosure, a method is disclosed of coupling a nose cone to a hub in a turbo machine having a central axis, the nose cone comprising a plurality of hub mounting elements disposed around the circumference of a base portion of the nose cone, each of the hub mounting elements comprising a flexible flange extending toward the central axis and having a ridge protruding from a radially outward facing surface, the hub comprising one or more mounting portions disposed around the circumference of the hub, the mounting portions extending radially inward from the hub and forming a mounting surface which defines a groove; the method comprising positioning the nose cone axially forward of and concentric with the hub, with each ridge of the plurality of hub mounting elements axially aligned with a respective groove of the plurality of mounting portions; and moving the nose cone in an axially aft direction until the flexible flanges deflect in an inward direction and each ridge of the plurality of hub mounting elements is engaged in a respective groove of the plurality of mounting portions.

In some embodiments an engaged position of the flexible flange is inwardly deflected relative to an unengaged position.

BRIEF DESCRIPTION OF THE DRAWINGS

The following will be apparent from elements of the figures, which are provided for illustrative purposes and are not necessarily to scale.

FIG. 3B is a sectional view of a nose cone in accordance with some embodiments of the present disclosure.

FIG. 4 is an isometric view of a hub configured to be coupled to the nose cone illustrated in FIGS. 3A and 3B, in accordance with some embodiments of the present disclosure.

Figure 1:
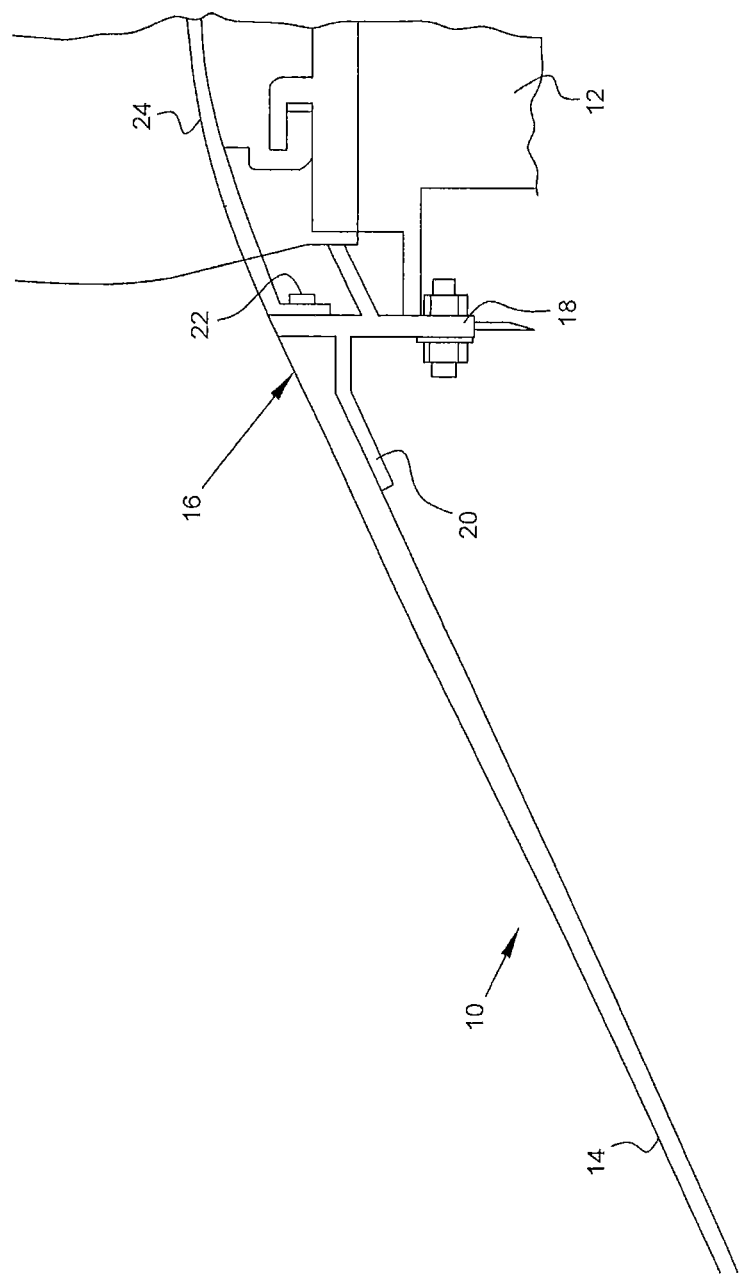
FIG. 1 is a partial sectional view of a nose cone connected to a fan rotor of an inlet fan of a gas turbine engine.
Figure 2:
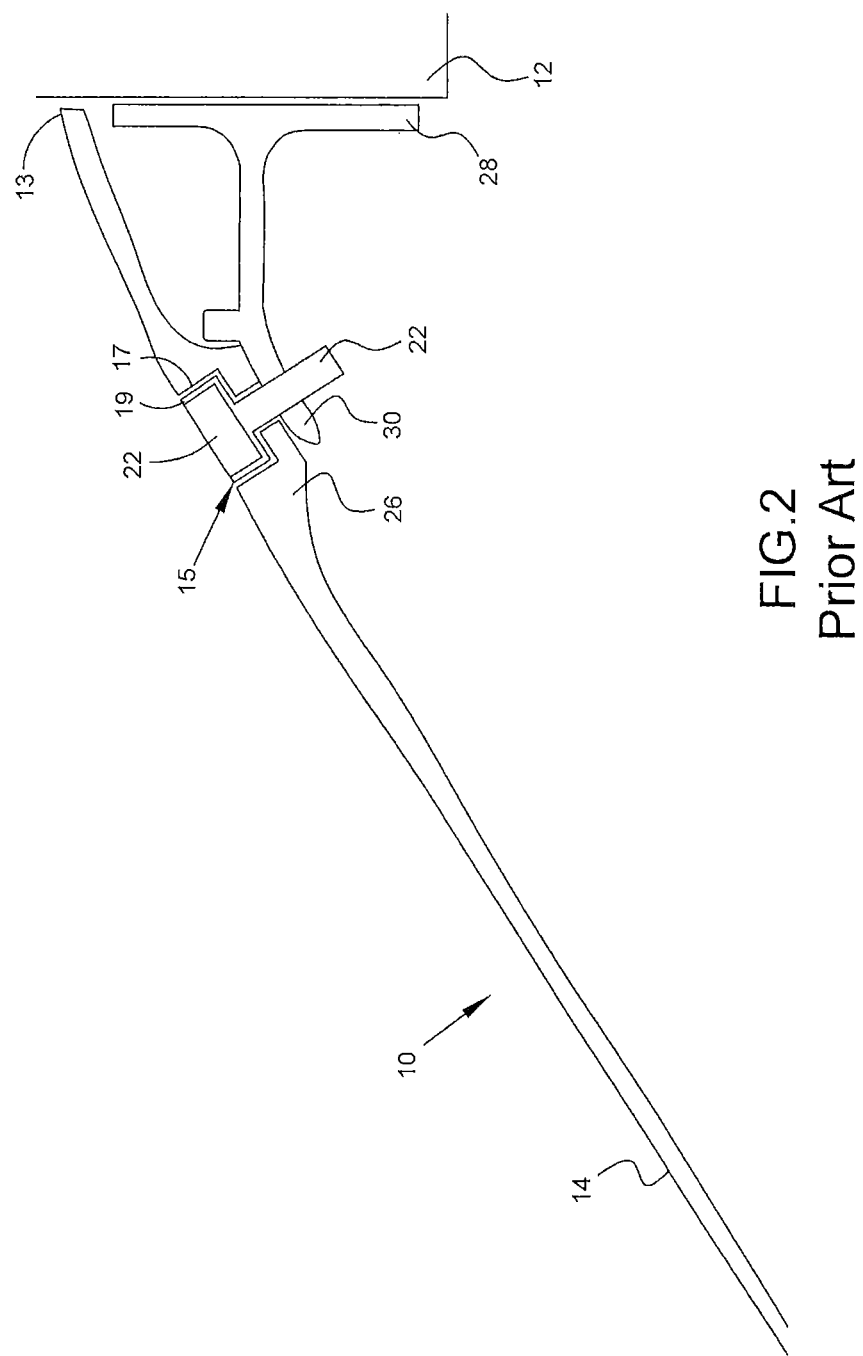
FIG. 2 is a partial sectional view of a nose cone connected to a fan rotor of an inlet fan of a gas turbine engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

As used herein, a turbine machine is understood to reference any machine using a turbine including gas turbine engines, wind turbines, steam turbines, water turbines, and the like. A turbine machine comprises at least a rotatable shaft and a plurality of blades.

The nose cone herein disclosed may be appropriately coupled to a rotating or a non-rotating component. Although the embodiments herein disclose the nose cone coupled to a bladed rotor which is rotatable, one of skill in the art would recognize that the disclosed nose cone is equally suitable for coupling to a non-rotating component. One of skill in the art would additionally recognize that the disclosed nose cones 110 and nose cone assemblies 100 could be used on a wide range of machines, including aircraft engines, non-rotating aircraft components, missiles, and UAVs.

The present disclosure is directed to a nose cone and nose cone assembly for reducing the weight and complexity required to mount the nose cone to a turbine machine. Although the disclosed nose cone is advantageously used with any number of turbine machines, the embodiments below may describe the nose cone as used with a turbine engine, such as a gas turbine engine for aviation applications. However, one of skill in the art would understand that the disclosed apparatus, systems, and methods are not so limited.

This disclosure presents embodiments to overcome the aforementioned deficiencies of nose cones and nose cone mounting configurations. More specifically, this disclosure is directed to a nose cone, nose cone assembly, and shaft balancing assembly which reduce the weight and complexity of mounting or coupling the nose cone. Detailed descriptions of the disclosed nose cone, nose cone assembly, and shaft balancing assembly, and additional advantages thereof, are presented below.

Figure 3A:
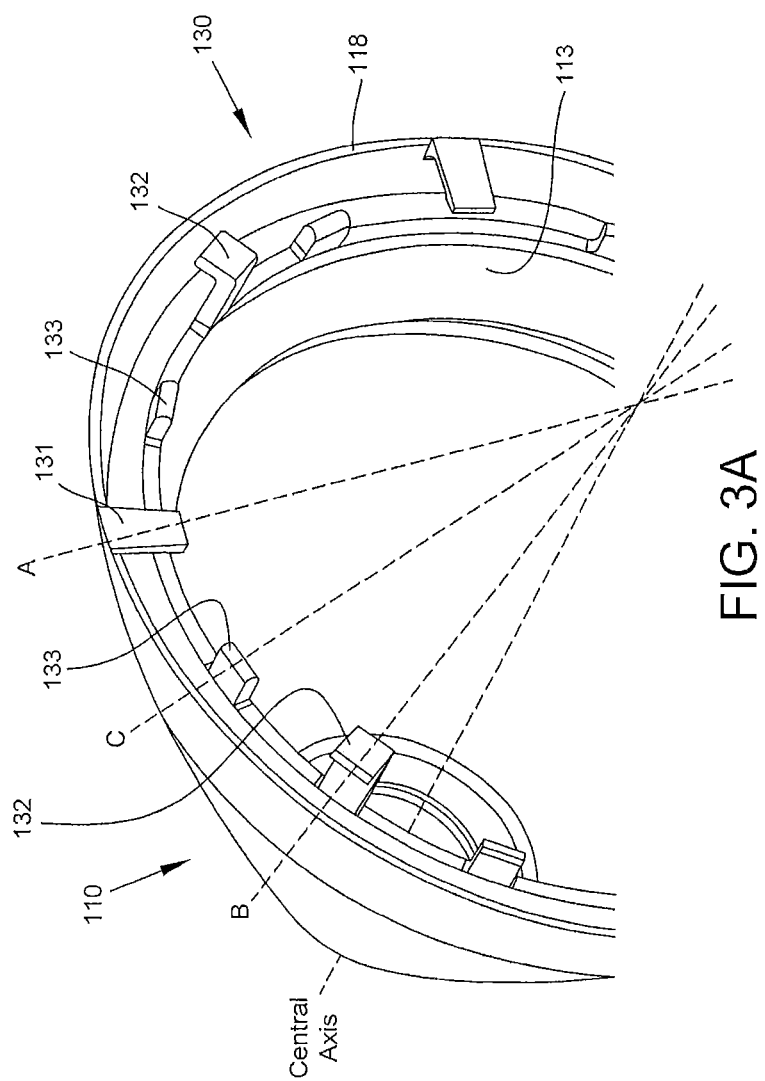
FIG. 3A is an isometric view of a nose cone in accordance with some embodiments of the present disclosure.

FIG. 3A is an isometric view of a nose cone 110 and FIG. 3B is a sectional view of the nose cone 110 in accordance with some embodiments of the present disclosure. Nose cone 110 comprises a flange member 114 which terminates at an annular hub mating surface 118 at the base portion 119 of nose cone 110. Flange member 114 has an outer surface 112 which defines an air flow path around the nose cone 110. Flange member 114 may comprise an annular mounting member 113 which extends radially inward from flange member 114 proximate the hub mating surface 118. Flange member 114 further extends radially about a central axis to form a hollow cone structure. In some embodiments flange member 114 may form a frustoconical outer surface 112, while in other embodiments flange member may form a parabolic outer surface 112. Flange member 114 may be referred to as the nose cone body.

Flange member 114 extends axially from an apex portion 111 to base portion 119. In some embodiments flange member 114 extends forward to integrally form a leading tip 116 of the nose cone 110. In other embodiments, such as the embodiment shown in FIGS. 3A and 3B the flange member 114 terminates at apex portion 111 with a radially inward extending member 115 and a nose cone tip 117 is removably mounted to the member 115. Thus in some embodiments the flange member 114 extends from a leading tip 116 of the nose cone 110 to a hub mating surface 118, whereas in other embodiments the flange member 114 extends from a radially inward extending member 115 to a hub mating surface 118. Nose cone 110 may be formed of metallic or composite materials.

In some embodiments mounting member 113 may be circumferentially segmented such that the full radial thickness of the member 113 is not present at all positions around the circumference of the flange member 114. In other words, in some embodiments the radially inward facing surface 125 of the mounting member 113 has a constant diameter around the circumference, while in other embodiments the radially inward facing surface 125 has varying diameters. Reductions in the radial thickness of the mounting member 113 may be made as a weight saving alteration.

Mounting member 113 and/or hub mating surface 118 may have a plurality of hub mounting elements 130 disposed circumferentially about the mounting member 113 and/or hub mating surface 118. Hub mounting elements 130 are configured to engage a hub 120. Hub mounting elements 130 include, but are not limited to, a flexible spring flange 131, a bayonet flange 132, and a pilot flange 133. Hub mounting elements 130 are spaced about the circumference of the mounting member 113 and/or hub mating surface 118 as indicated by the axes labeled A, B, and C. In some embodiments flexible spring flange 131 extends radially inward from the hub mating surface 118 while bayonet flange 132 and pilot flange 133 extend axially aft from mounting member 113.

Figure 5A:
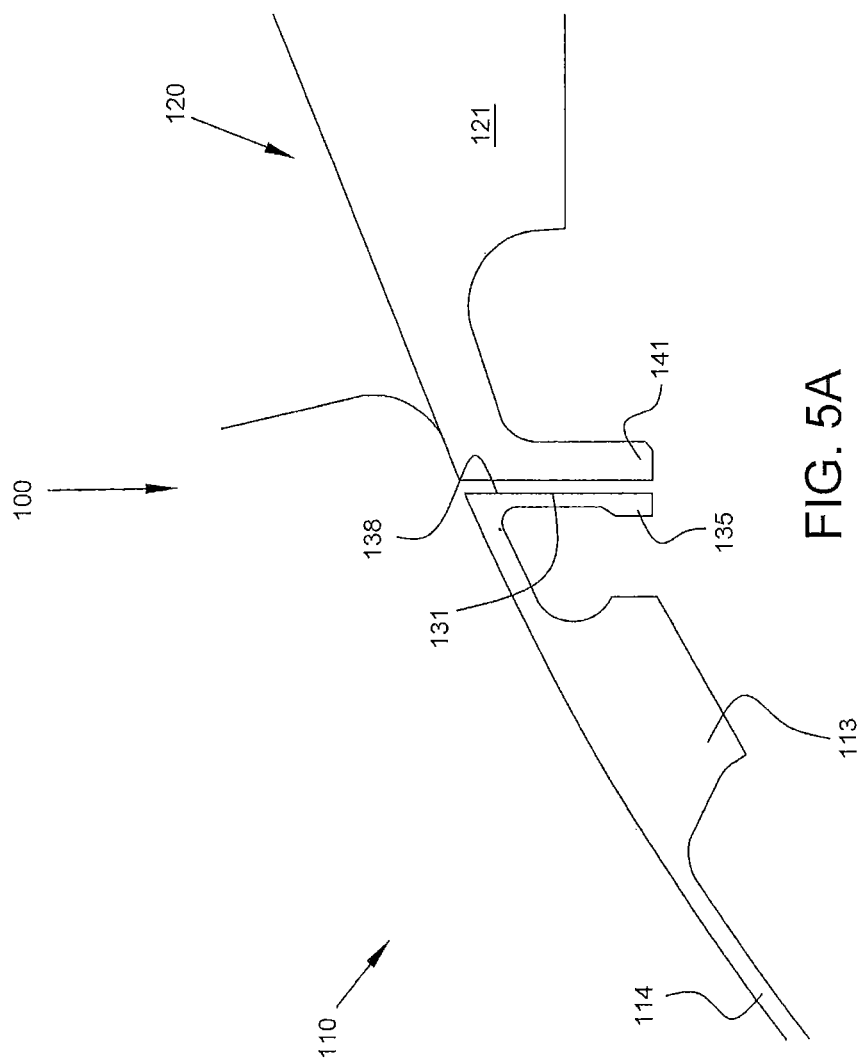
FIG. 5A is a partial sectional view of the nose cone of FIGS. 3A and 3B coupled to the hub of FIG. 4, shown along axis A, in accordance with some embodiments of the present disclosure.
Figure 5B:
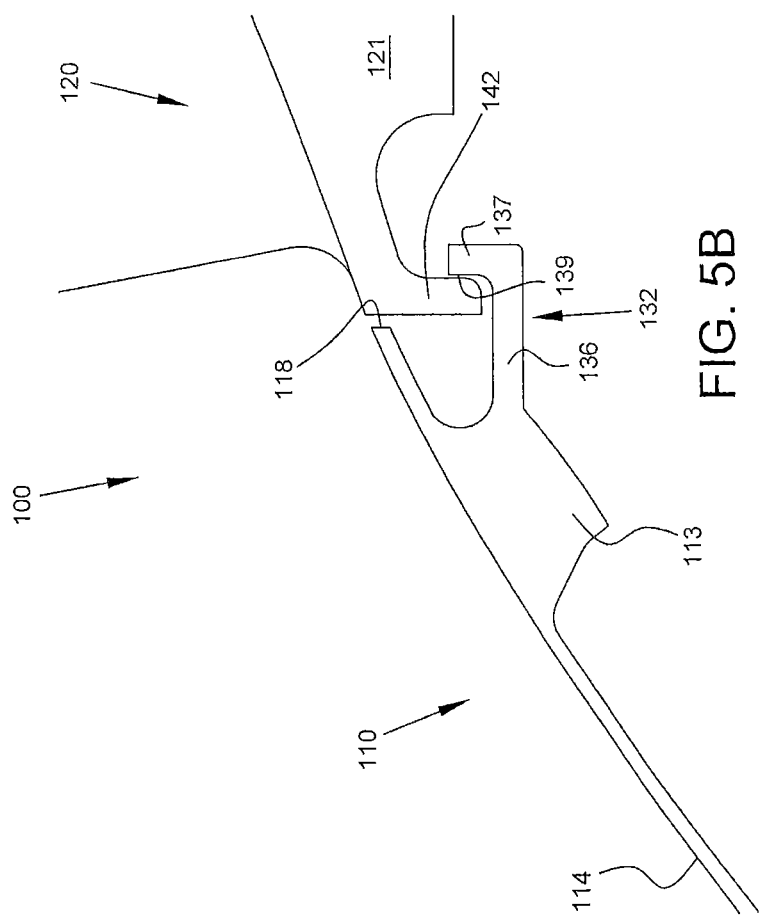
FIG. 5B is a partial sectional view of the nose cone of FIGS. 3A and 3B coupled to the hub of FIG. 4, shown along axis B, in accordance with some embodiments of the present disclosure.
Figure 5C:
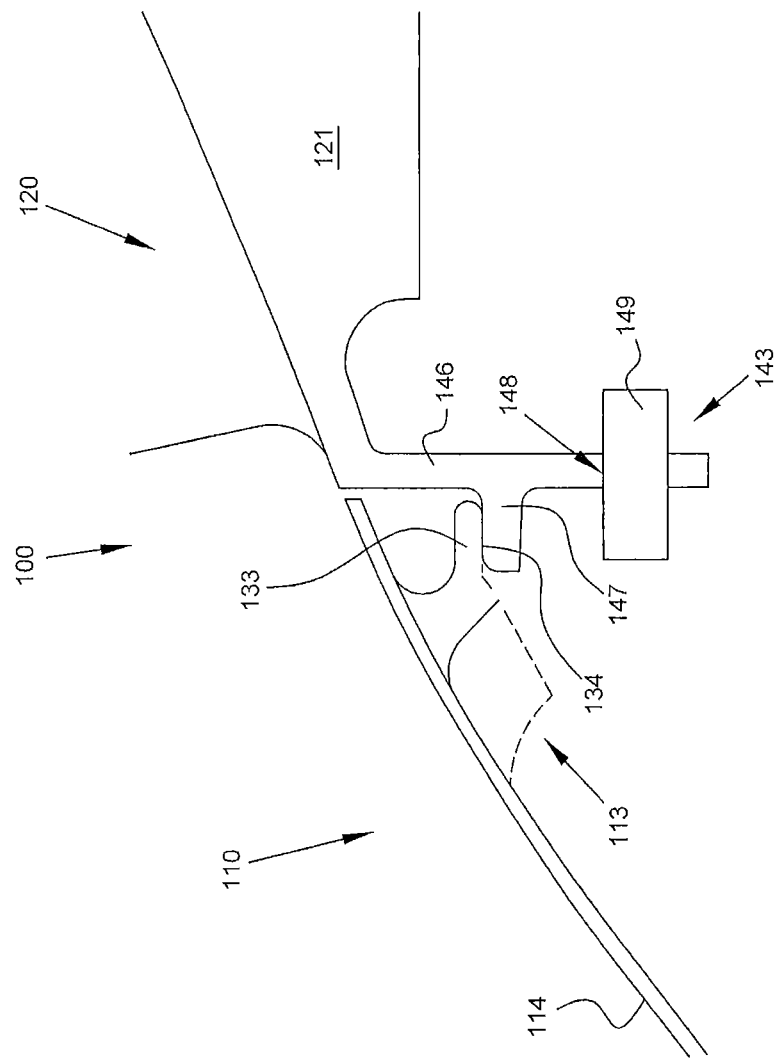
FIG. 5C is a partial sectional view of the nose cone of FIGS. 3A and 3B coupled to the hub of FIG. 4, shown along axis C, in accordance with some embodiments of the present disclosure.

Sectional views of the nose cone 110 coupled to the hub 120 as intersected by a plane along the axes A, B, and C are presented in FIGS. 5A, 5B, and 5C. The coupling of nose cone 110 to hub 120 forms a nose cone assembly 100.

In some embodiments the positioning of the hub mounting elements 130 is symmetrical, such that an element 130 at one intersection of axis A and the hub mating surface 118 is the same as an element 130 at the opposite intersection of axis A and the hub mating surface 118. However, in some embodiments the hub mounting elements 130 are not symmetrically positioned, such that the opposite intersection of axis A and the hub mating surface 118 may have a different mounting element 130 or no mounting element 130.

At a first circumferential position identified by the intersection of axis A and the hub mating surface 118, a flexible spring flange 131 is coupled to the hub mating surface 118. Spring flange 131 comprises a radially inward extending member 135 which may have a varying axial thickness. In the illustrated embodiment, for example, the member 135 is relatively thicker in the axial dimension at the radially inward end. Member 135 has a hub engaging surface 138 which may be parallel to and facing the same direction as hub mating surface 118. In some embodiments spring flange 131 comprises a member 135 which extends radially inward from and axially beyond the plane of the hub mating surface 118.

Spring flange 131 is configured to provide a biasing force in the axial direction. When nose cone 110 is coupled to hub 120, spring flange 131 provides an axial separation force between the nose cone 110 and hub 120. In some embodiments spring flange 131 may include lead-in features such as chamfers to aid the coupling of nose cone 110 to hub 120.

During the coupling process of the nose cone 110 to the hub 120, the spring flange 131 is configured to deflect as the peak assembly displacement is greater than the axial displacement provided by the spring flange 131 once fully assembled. In some embodiments the thickness of spring flange 131 is adapted to provide a desired axial displacement force. In some embodiments the spring flange 131 may include a protruding and/or mating receptacle feature configured to engage once the nose cone 110 and hub 120 are correctly circumferentially positioned during assembly. Such a feature aids in maintaining circumferential alignment between the nose cone 110 and hub 120 during operation.

The axial displacement force imparted by the one or more spring flanges 131 disposed about the base portion 119 of nose cone 110 must be sufficient to withstand maximum operating loads. As with most nose cone designs, this includes the maximum loading experienced during a bird strike. The spring flanges 131 may be configured to impart sufficient axial displacement force such that decoupling of the nose cone 110 and hub 120 is only possible under loading from an assembly/disassembly tool. Such a tool may engage the nose cone 110 via trim balance apertures in surface 112.

At a second circumferential position identified by the intersection of axis B and the hub mating surface 118, a bayonet flange 132 extends from the mounting member 113. Bayonet flange 132 comprises an axially extending member 136 and a retaining lip 137. Retaining lip 137 has a hub engaging surface 139 which may be parallel to and facing in the opposite direction as the hub mating surface 118. Bayonet flange 132 is configured to engage a portion of hub 120 resulting in the axial retention of nose cone 110. In some embodiments bayonet flange 132 may include lead-in features such as chamfers to aid the coupling of nose cone 110 to hub 120.

At a third circumferential position identified by the intersection of axis C and the hub mating surface 118, a pilot flange 133 extends from the mounting member 113. As illustrated, pilot flange 133 extends axially aft from the mounting member 113 and is configured to engage a portion of hub 120 to maintain concentricity of nose cone 110 to hub 120. Pilot flange 133 has a hub engaging surface 134 which may be perpendicular to the hub mating surface 118.

One or more flexible spring flanges 131 may be disposed about the circumference of base portion 119. One or more bayonet flanges 132 may be disposed about the circumference of base portion 119. One or more pilot flanges 133 may be disposed about the circumference of base portion 119.

FIG. 4 is an isometric view of a hub 120 configured to be coupled to the nose cone 110 illustrated in FIGS. 3A and 3B, in accordance with some embodiments of the present disclosure. In the illustrated embodiment, hub 120 is a bladed rotor of a turbine machine. However, in other embodiments the hub 120 may be another component of a turbine machine including a static (i.e. non-rotating) component.

In the illustrated embodiment, hub 120 comprises a hollow cylindrical rotor 121 which extends radially about a central axis and has a plurality of blades 123 extending radially therefrom. An axially aft portion of the rotor 121 may comprise a mating flange (not shown) configured to couple the rotor 121 to a rotating shaft (not shown). An axially forward portion of the rotor 121 may comprise a plurality of nose cone retention elements 140 configured to retain the nose cone 110 described with reference to FIGS. 3A and 3B. Nose cone retention elements 140 may include one or more spring flange mating surfaces 141, bayonet retainers 142, and pilot guides 143. Nose cone retention elements 140 may be circumferentially disposed about the forward portion of the rotor 121 and may be spaced apart by gaps 144. The forward portion of the rotor 121 may comprise a planar mounting surface 145.

Spring flange mating surfaces 141 are configured to abut spring flanges 131 when nose cone 110 is coupled to hub 120. Each spring flange 131 is aligned with a respective spring flange mating surface 141 and pushes against the spring flange mating surface 141 to impart axial force on nose cone 110.

Bayonet retainers 142 are configured to retain bayonet flanges 132 of nose cone 110 when nose cone 110 is coupled to hub 120. Each bayonet flange 132 is aligned with a respective bayonet retainer 142. Bayonet retainers 142 extend radially inward from rotor 121 such that the retention lip 137 of a bayonet flange 132 will engage the bayonet retainer 142 and axially forward motion of the nose cone 110 will be prevented.

Pilot guides 143 are configured to abut pilot flanges 133 in order to maintain concentricity of nose cone 110 to hub 120. In some embodiments pilot guides 143 comprise a radially extending portion 146 and an axially extending portion 147. The axially extending portion 147 is configured to engage the pilot flange 133 when nose cone 110 is coupled to hub 120. Each pilot flange 133 is aligned with a respective pilot guide 143. The radially extending portion 146 may include an aperture 148 configured to receive balancing weights 149.

In some embodiments an axially forward facing planar mounting surface 145 represents the forwardmost extension of the rotor 121. In some embodiments one or more of the nose cone retention elements 140 are integral to mounting surface 145.

The nose cone 110 described above with reference to FIGS. 3A and 3B may be coupled to the hub 120 described above with reference to FIG. 4. To couple the nose cone 110 and hub 120, the nose cone 110 must be positioned axially forward from the hub 120 with bayonet flanges 132 circumferentially aligned with gaps 144 between the nose cone retention elements 140 of hub 120. Nose cone 110 may then be moved axially aft such that the retention lip 137 of each bayonet flange 132 is axially aft of the bayonet retainers 142 of the hub 120. Nose cone 110 may then be rotated to engage each bayonet flange 132 with a respective bayonet retainer 142. In some embodiments, it will be essential that the retention lips 137 of the bayonet flanges 132 begin to engage their respective bayonet retainer 142 prior to engagement of the spring flanges 131. This will allow the retention lips 137 to be axially engaged with hub 120 prior to the axial separating force being imparted by the spring flanges 131, and thus prevent separation of nose cone 110 from hub 120.

FIGS. 5A, 5B, 5C, and 5D provide sectional views of a nose cone 110 coupled to a hub 120.

FIG. 5A is a partial sectional view of the nose cone 110 of FIGS. 3A and 3B coupled to the hub 120 of FIG. 4, shown along axis A, in accordance with some embodiments of the present disclosure. When coupled, spring flange 131 abuts an opposing spring flange mating surface 141. When abutting the spring flange mating surface 141, spring flange 131 is flexed thus imparting an axially forwarded force on nose cone 110. Each spring flange 131 is aligned with a respective spring flange mating surface 141 and pushes against the spring flange mating surface 141 to impart axial force on nose cone 110.

FIG. 5B is a partial sectional view of the nose cone 110 of FIGS. 3A and 3B coupled to the hub 120 of FIG. 4, shown along axis B, in accordance with some embodiments of the present disclosure. Retention lip 137 of bayonet flange 132 is engaged axially aft of bayonet retainer 142, thus preventing axially forward movement of nose cone 110. In some embodiments hub mating surface 118 may abut rotor 121.

FIG. 5C is a partial sectional view of the nose cone 110 of FIGS. 3A and 3B coupled to the hub 120 of FIG. 4, shown along axis C, in accordance with some embodiments of the present disclosure. Pilot flange 133 abuts the axially extending portion 147 of pilot guide 143 to ensure the proper disposition of nose cone 110 relative to hub 120. In rotating embodiments, the abutment of pilot guide 143 and pilot flange 133 ensures proper concentricity of nose cone 110 to hub 120.

In some embodiments an aperture 148 may be defined by radially extending portion 146 of the pilot guide 143 and may be configured to receive one or more balancing weights 149 which may be coupled to pilot guide 143 with a fastener. During nose cone 110 balancing, balancing weights 149 of varying masses may be placed in aperture 148 to ensure an evenly distributed nose cone mass, which assists with stable rotation of the nose cone 110 during operation. In some embodiments a plurality of apertures 148 are provided, each defined by a respective pilot guide 143.

Figure 5D:
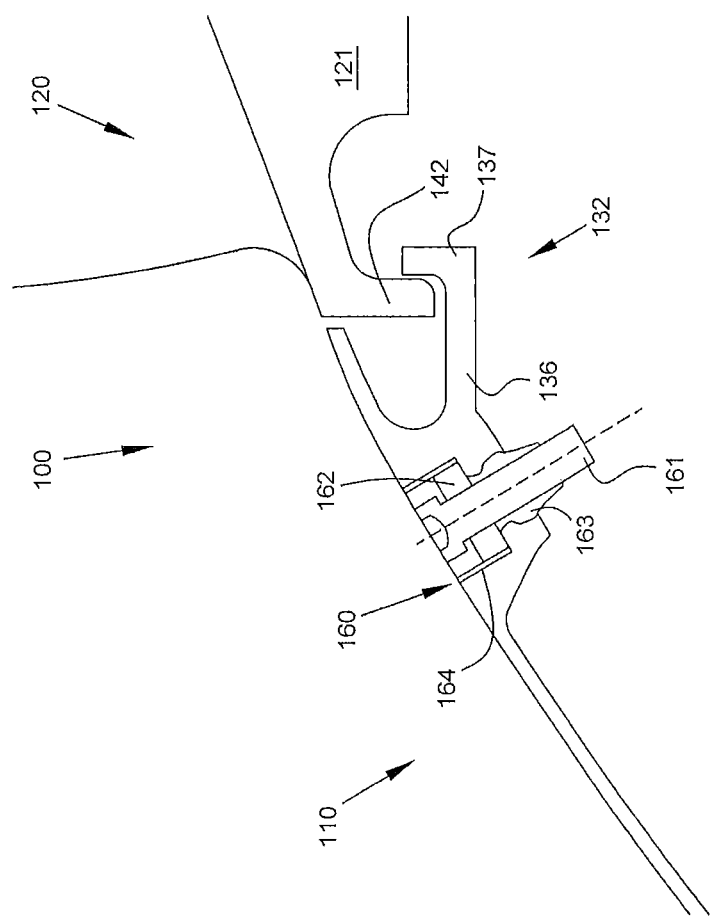
FIG. 5D is a partial sectional view of the nose cone of FIGS. 3A and 3B coupled to the hub of FIG. 4, shown along axis B, in accordance with some embodiments of the present disclosure.

FIG. 5D is a partial sectional view of the nose cone 110 of FIGS. 3A and 3B coupled to the hub 120 of FIG. 4, shown along axis B, in accordance with some embodiments of the present disclosure. Retention lip 137 of bayonet flange 132 is engaged axially aft of bayonet retainer 142, thus preventing axially forward movement of nose cone 110. In some embodiments hub mating surface 118 may abut rotor 121.

In the embodiment illustrated in FIG. 5D, an aperture 160 is provided through mounting member 113 for the placement of balancing weights 162. A bolt 161 and retaining nut 163 may be used to secure the balancing weight 162 in position. During nose cone 110 balancing, balancing weights 162 of varying masses may be placed in aperture 160 to ensure an evenly distributed nose cone mass, which assists with stable rotation of the nose cone 110 during operation. In some embodiments a plurality of apertures 160 are provided in nose cone 110. In some embodiments nose cone 110 further defines a countersink 164 around the aperture 160 configured to receive the balancing weight 162.

In some embodiments balancing weight 162 is omitted, and balancing of the nose cone 110 is achieved using fasteners of varying lengths and thus of varying weights. This balancing method allows for reduction of the diameter of the countersink 164, and thus the reduction of the reinforcement required in the vicinity of countersink 164. Reducing the thickness of flange member 114 and/or mounting member 113 reduces the weight of nose cone 110.

Figure 6:
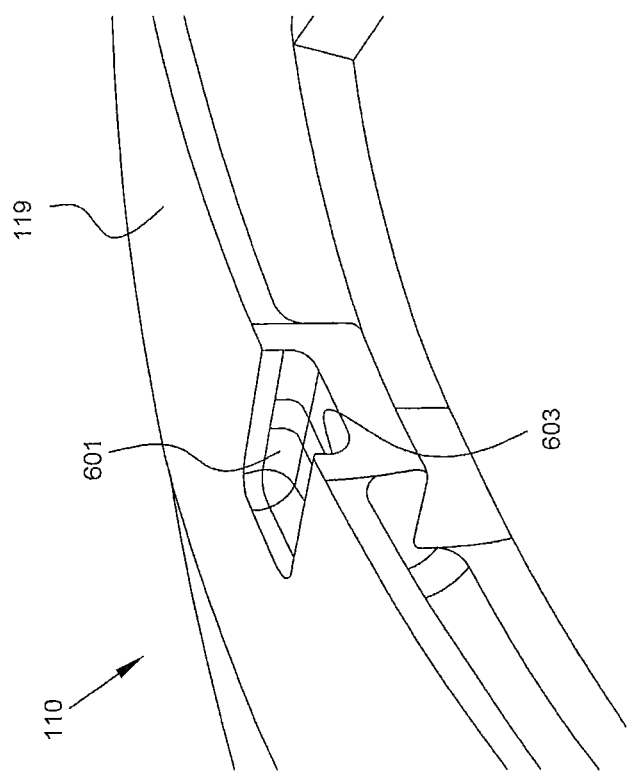
FIG. 6 is a partial isometric view of the base of a nose cone having a pocket configured to receive a removable spring mechanism in accordance with some embodiments of the present disclosure.
Figure 7:
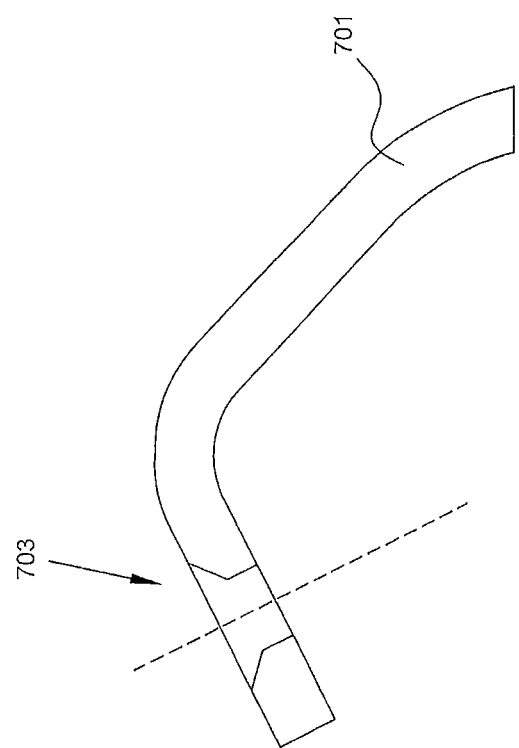
FIG. 7 is a removable spring mechanism in accordance with some embodiments of the present disclosure.

In some embodiments, the manufacture of nose cone 110 is simplified by omitting the spring flanges 131 during initial manufacture. Spring flanges 131 are then added to nose cone 110 prior to coupling with hub 120. FIG. 6 is a partial isometric view of the base portion 119 of a nose cone 110 having a pocket 601 configured to receive a removable spring mechanism 701 in accordance with some embodiments of the present disclosure. The pocket 601 is formed in the surface 112 of flange 114, and in some embodiments defines an aperture 603. FIG. 7 is a removable spring mechanism 701 configured to be inserted into the pocket 601 in accordance with some embodiments of the present disclosure. In some embodiments, spring mechanism 701 may be configured to partially rest in pocket 601 and be secured with a fastener through a spring mechanism hole 703 and the aperture 603. In other embodiments, spring mechanism 701 may be configured to be inserted at least partially through the aperture 603 and may be secured in place with or without a fastener. In some embodiments spring mechanism 701 may be secured through the aperture 603 with an adhesive.

Figure 8:
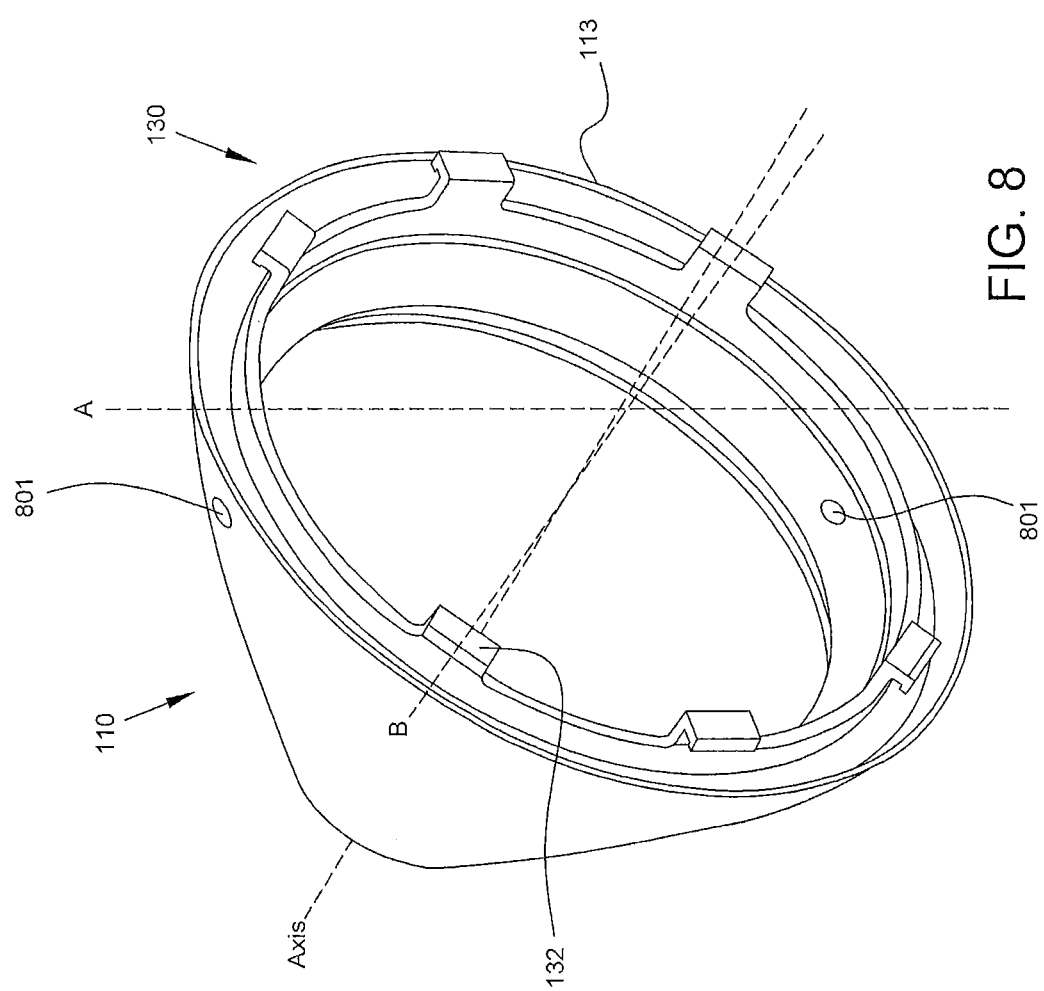
FIG. 8 is an isometric view of a nose cone in accordance with some embodiments of the present disclosure.

In some embodiments of the present disclosure, a nose cone assembly 100 is provided which significantly reduces the number of fasteners required to couple nose cone 110 to hub 120. For example, FIG. 8 is an isometric view of a nose cone 110 in accordance with some embodiments of the present disclosure. In the embodiment illustrated in FIG. 8, nose cone 110 has a plurality of hub mounting elements 130 including a plurality of bayonet flanges 132 and, in some embodiments, a plurality of pilot flanges 133. Hub mounting elements 130 are configured to engage hub 120 and to retain coupling of nose cone 110 to hub 120. Hub mounting elements 130 are spaced about the circumference of the mounting member 113 or hub mating surface 118 as indicated by axes A and B. Sectional views of the nose cone 110 coupled to hub 120 as intersected by a plane along axes A, B, and C are presented in FIGS. 10A, 10B, and 10C.

The nose cone 110 of FIG. 8 additionally has at least a pair of apertures 801 which pass through the flange member 114 and mounting member 113. Apertures 801 are configured to receive a fastener there through for coupling the nose cone 110 to a hub 120. Apertures 801 are located along an axial plane extending from axis A. Additionally a plurality of bayonet flanges 132 are spaced about the circumference of the mounting member 113, and at least one bayonet flange 132 is disposed in an axial plane extending from axis B.

Figure 9:
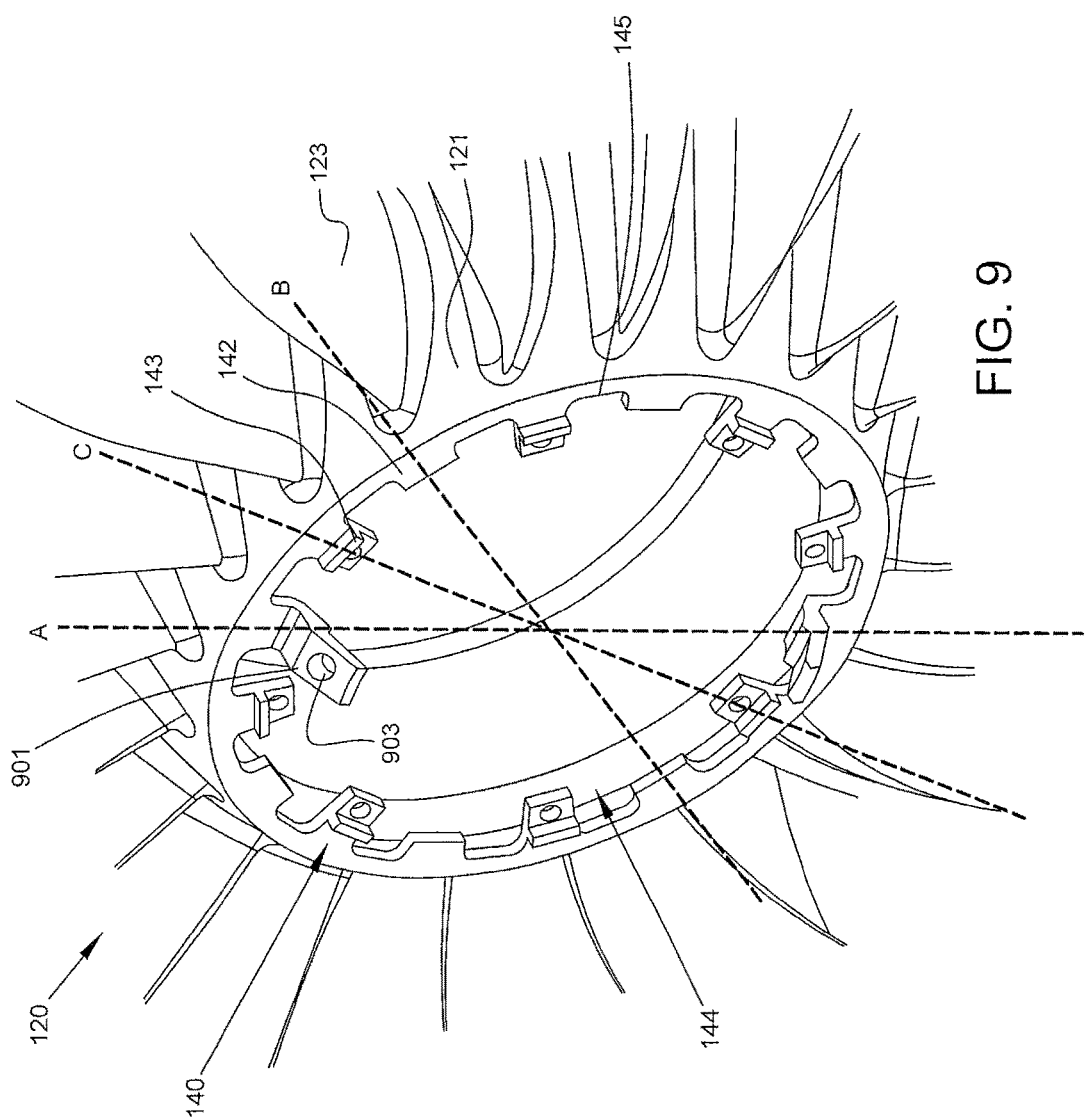
FIG. 9 is an isometric view of a hub configured to be coupled to the nose cone illustrated in FIG. 8, in accordance with some embodiments of the present disclosure.

FIG. 9 is an isometric view of a hub 120 configured to be coupled to the nose cone 110 illustrated in FIG. 8, in accordance with some embodiments of the present disclosure. Hub 120 is illustrated in FIG. 9 as a bladed rotor; however, the hub 120 may take the form of other engine components including non-rotating components.

Hub 120 comprises a rotor 121 with a plurality of blades 123 extending radially outward therefrom. The axially forward portion of the rotor 121 comprises a plurality of nose cone retention elements 140 configured to engage the hub mounting elements 130 of the nose cone 110 and therefore retain coupling between the nose cone 110 and hub 120. Nose cone retention elements 140 in the illustrated embodiment include one or more of a mounting flange 901, a bayonet retainer 142, and pilot guides 143. Nose cone retention elements 140 may be circumferentially disposed about the forward portion of rotor 121 and may be spaced apart by gaps.

Each mounting flange 901 extends axially forward from the axially forward portion of the rotor 121 and defines a mounting aperture 903. The mounting flange 901 may be sized and configured such that the mounting aperture 903 aligns with one of the apertures 801 of the nose cone 110 when nose cone 110 is properly coupled to hub 120. A fastener such as a bolt or screw is able to be passed through aperture 801 and mounting aperture 903 in order to secure nose cone 110 to hub 120. Mounting flanges 901 thus serve primarily to prevent either axial or circumferential motion of nose cone 110 relative to hub 120. By preventing circumferential motion of nose cone 110 relative to hub 120, mounting flanges 901 ensure continuous engagement of bayonet flanges 132 to bayonet retainers 142.

In the illustrated embodiment a pair of mounting flanges 901 are provided with hub 120 and configured to align with a pair of apertures 801. In some embodiments only a single mounting flange 901 and aperture 801 are provided. In other embodiments, more than two mounting flanges 901 and apertures 801 are provided.

As described above, bayonet retainers 142 and pilot guides 143 are configured to engage bayonet flanges 132 and pilot flanges 133, respectively. Bayonet flanges 132 and bayonet retainers 142 are configured to reduce the load capability requirements on the mounting flanges 901 described above.

The nose cone 110 described above with reference to FIG. 8 may be coupled to the hub 120 described above with reference to FIG. 9. To couple the nose cone 110 and hub 120, the nose cone 110 must be positioned axially forward from the hub 120 with bayonet flanges 132 circumferentially aligned with gaps 144 between the nose cone retention elements 140 of hub 120. Nose cone 110 may then be moved axially aft such that the retention lip 137 of each bayonet flange 132 is axially aft of the bayonet retainers 142 of the hub 120. Nose cone 110 may then be rotated to engage each bayonet flange 132 with a respective bayonet retainer 142. Rotating the nose cone 110 into proper alignment with hub 120 will serve to (1) engage the bayonet flanges 132 to the bayonet retainers 142, (2) align apertures 801 with a respective aperture 903, and (3) engage pilot flanges 133 to the axially extending portion 147 of pilot guide 143. A fastener is then passed through the aperture 801 and aperture 903 and secured to complete the coupling of nose cone 110 to hub 120.

The use of a plurality of bayonet flanges 132 and bayonet retainers 142 when coupling nose cone 110 to hub 120 advantageously allows for reduction of fasteners as compared to the prior art. Reducing the number of bolts which pass through the nose cone 110 allows for reduction in the overall weight of the nose cone assembly, both by reducing the heavy bolts used to couple nose cone 110 to hub 120 and by reducing the amount of reinforcement required around the receiving apertures in the nose cone 110. Further, ease of manufacture is improved by reducing the number of receiving apertures which are required to pass through the base of the nose cone 110. The ease of assembly may also be improved as less fasteners are required to secure nose cone 110 to hub 120.

Figure 10A:
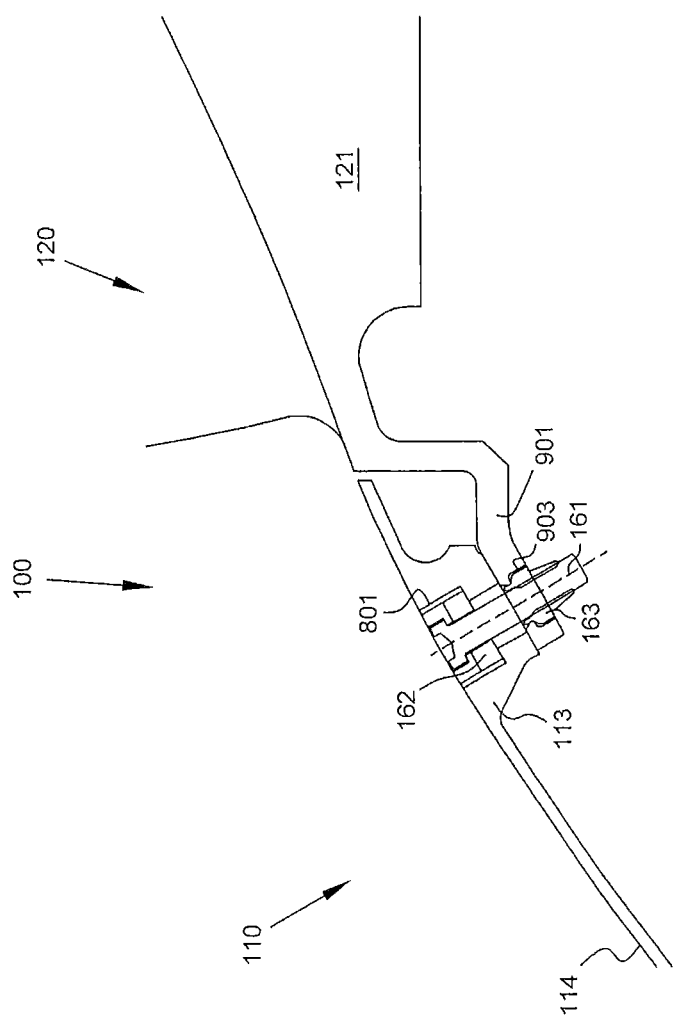
FIG. 10A is a partial sectional view of the nose cone of FIG. 8 coupled to the hub of FIG. 9, shown along axis A, in accordance with some embodiments of the present disclosure.

FIGS. 10A, 10B, 10C, and 10D provide sectional views of a nose cone 110 coupled to a hub 120. FIG. 10A is a partial sectional view of the coupling of the nose cone of FIG. 8 and the hub 120 of FIG. 9, shown along axis A, in accordance with some embodiments of the present disclosure.

In some embodiments a balancing weight 162 may be included when securing nose cone 110 to hub 120 with a bolt 161. A bolt 161 and retaining nut 163 may be used to secure the balancing weight 162 in position. During nose cone 110 balancing, balancing weights 162 of varying masses may be placed in aperture 160 to ensure an evenly distributed nose cone mass, which assists with stable rotation of the nose cone 110 during operation. In some embodiments a plurality of apertures 160 are provided in nose cone 110.

Figure 10B:
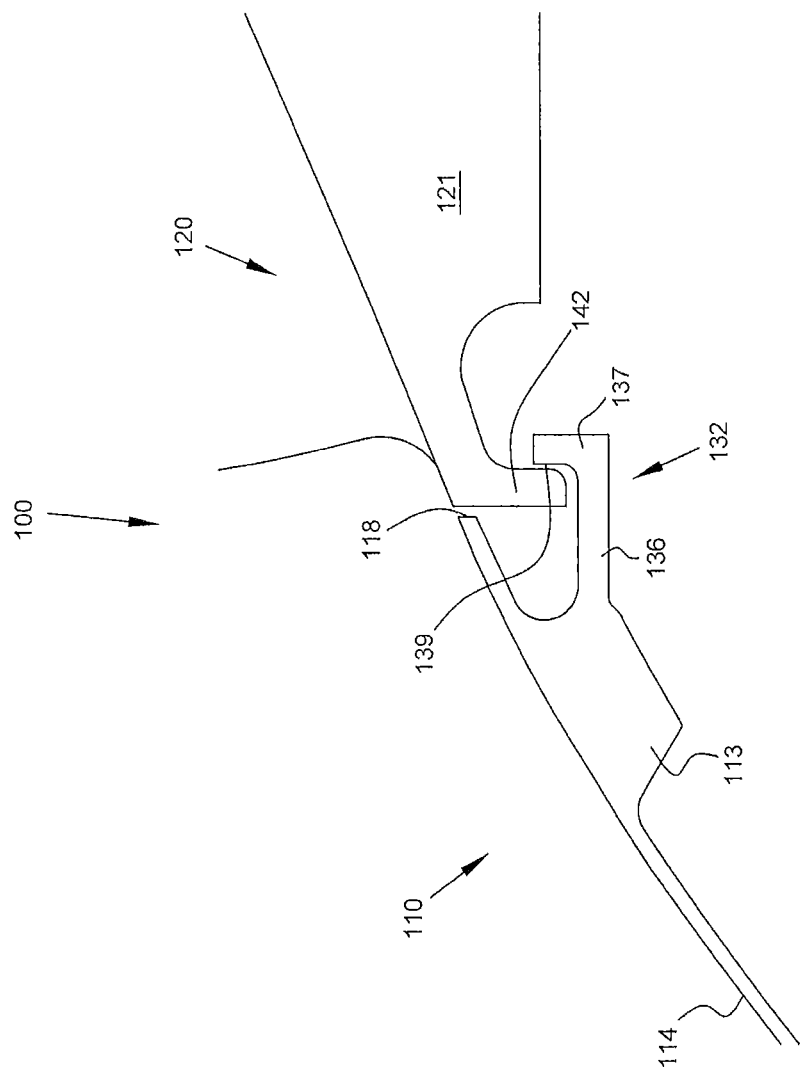
FIG. 10B is a partial sectional view of the nose cone of FIG. 8 coupled to the hub of FIG. 9, shown along axis B, in accordance with some embodiments of the present disclosure.

FIG. 10B is a partial sectional view of the coupling of the nose cone of FIG. 8 and the hub 120 of FIG. 9, shown along axis B, in accordance with some embodiments of the present disclosure. Retention lip 137 of bayonet flange 132 is engaged axially aft of bayonet retainer 142, thus preventing axially forward movement of nose cone 110. In some embodiments hub mating surface 118 may abut rotor 121.

Figure 10C:
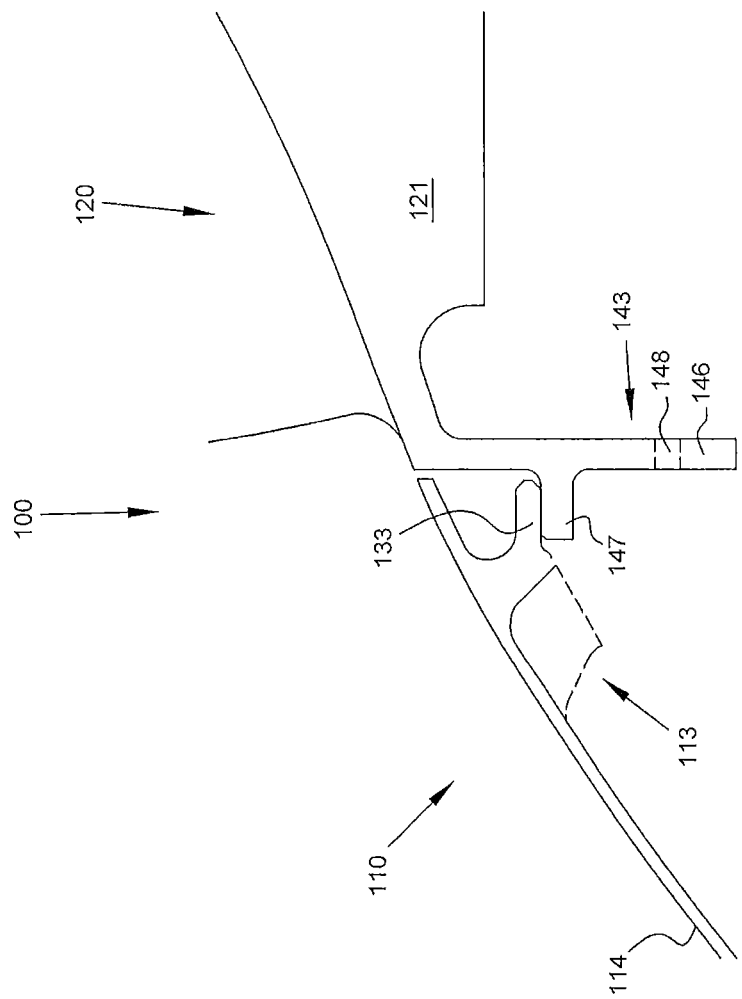
FIG. 10C is a partial sectional view of the nose cone of FIG. 8 coupled to the hub of FIG. 9, shown along axis C, in accordance with some embodiments of the present disclosure.

FIG. 10C is a partial sectional view of the coupling of the nose cone of FIG. 8 and the hub 120 of FIG. 9, shown along axis C, in accordance with some embodiments of the present disclosure. Pilot flange 133 abuts the axially extending portion 147 of pilot guide 143 to ensure the proper disposition of nose cone 110 relative to hub 120. In rotating embodiments, the abutment of pilot guide 143 and pilot flange 133 ensures proper concentricity of nose cone 110 to hub 120. In some embodiments an aperture 148 may be defined by radially extending portion 146 of the pilot guide 143 and may be configured to receive one or more balancing weights 149 which may be coupled to pilot guide 143 with a fastener.

Figure 10D:
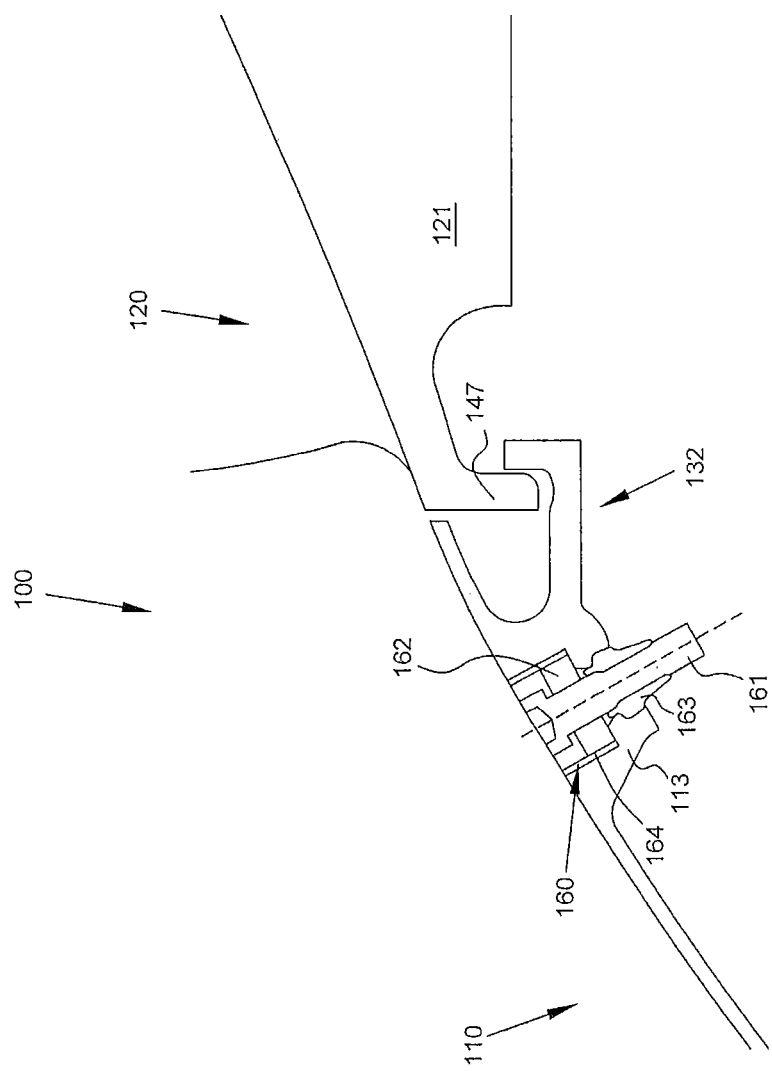
FIG. 10D is a partial sectional view of the nose cone of FIG. 8 coupled to the hub of FIG. 9, shown along axis D, in accordance with some embodiments of the present disclosure.

FIG. 10D is a partial sectional view of the coupling of the nose cone of FIG. 8 and the hub 120 of FIG. 9, shown along axis D, in accordance with some embodiments of the present disclosure. Retention lip 137 of bayonet flange 132 is engaged axially aft of bayonet retainer 142, thus preventing axially forward movement of nose cone 110. In some embodiments hub mating surface 118 may abut rotor 121. In the embodiment illustrated in FIG. 5D, an aperture 160 is provided through mounting member 113 for the placement of balancing weights 162. A bolt 161 and retaining nut 163 may be used to secure the balancing weight 162 in position.

Figure 11:
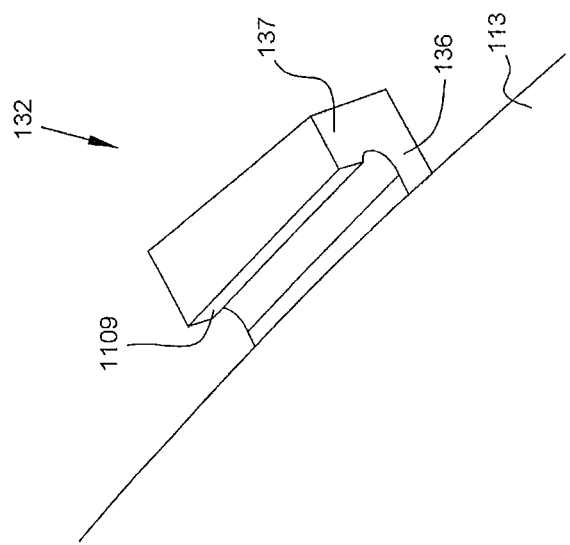
FIG. 11 is an isometric view of a bayonet flange of a nose cone in accordance with some embodiments of the present disclosure.

FIG. 11 is an isometric view of a bayonet flange 132 of a nose cone 110 in accordance with some embodiments of the present disclosure. In some embodiments the axially forward facing surface 1109 of retaining lip 137 may be laterally or radially tapered. Tapering of the surface 1109 may assist in engagement between the bayonet flange 132 and bayonet retainer 142. The tapered surface 1109 may use linear or parabolic tapers. The taper may be machined into the surface during manufacturing or may be added as a separate molded part which is bonded to the bayonet flange 132.

Figure 12:
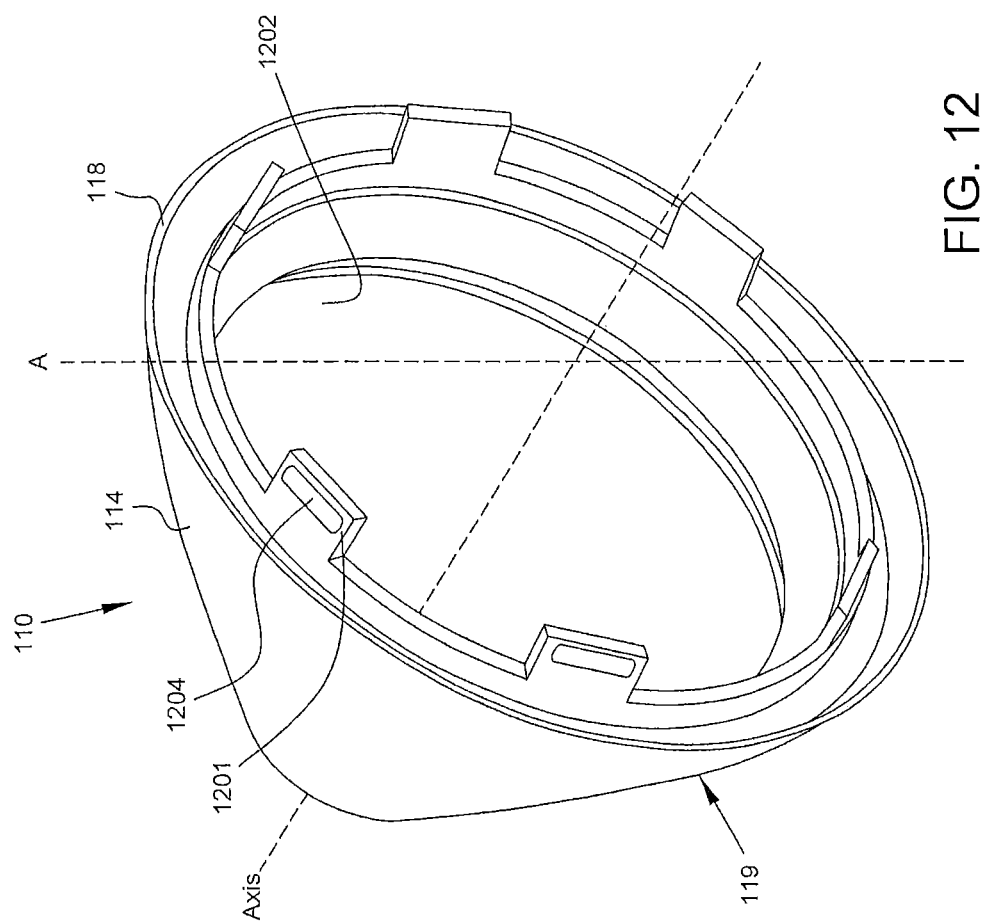
FIG. 12 is an isometric view of a nose cone in accordance with some embodiments of the present disclosure.
Figure 13:
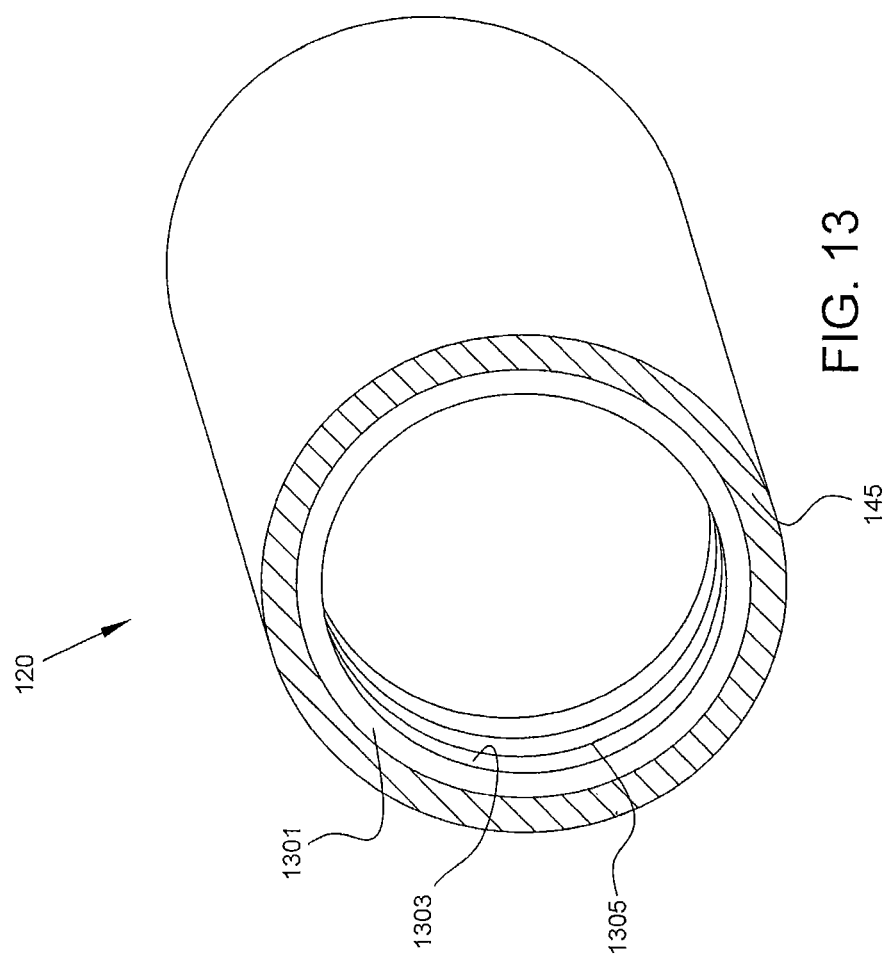
FIG. 13 is an isometric view of a hub configured to be coupled to the nose cone illustrated in FIG. 12, in accordance with some embodiments of the present disclosure.

In some embodiments of the present disclosure a nose cone assembly 100 is disclosed which eliminates the use of a support ring and fasteners when coupling nose cone 110 to hub 120 by employing a snap fit configuration. For example, FIG. 12 is an isometric view of a nose cone 110 in accordance with some embodiments of the present disclosure. FIG. 13 is an isometric view of a hub 120 configured to be coupled to the nose cone 110 illustrated in FIG. 12, in accordance with some embodiments of the present disclosure.

Nose cone 110 has one or more hub mounting members 1201 extending from a radially inner surface 1202 of flange member 114. In some embodiments, the at least one hub mounting member 1201 extends from an annular mounting member 113 which is formed on or integral to the radially inner surface 1202. In some embodiments a single annular hub mounting member 1201 may be provided. In other embodiments, such as that illustrated in FIG. 12, a plurality of distinct hub mounting members 1201 are spaced about the circumference of the radially inner surface 1202 proximate the base portion 119. In still further embodiments, the at least one hub mounting member 1201 extends from the annular hub mating surface 118.

Each hub mounting member 1201 of nose cone 110 comprises a flexible flange 1203 extending inwardly from flange member 114 and/or mounting member 113, and a protruding ridge 1204. The protruding ridge 1204 extends from a radially outward facing surface 1205 of the flexible flange 1203 and is configured to be received in a corresponding groove 1305 of the hub 120. In some embodiments flexible flange 1203 and/or protruding ridge 1204 include lead-in features such as a chamfered edge to assist in flexible flange 1203 deflection upon engagement with hub 120. In some embodiments protruding ridge 1204 may be shortened to comprise a protruding nub.

Hub 120 comprises a rotor 121 with a plurality of blades 123 extending radially outward therefrom. The forward portion of the rotor 121 may comprise a planar mounting surface 145. The axially forward portion of the rotor 121 comprises an annular mounting portion 1301 which extends radially inward from rotor 121 and has an annular mounting surface 1303. The annular mounting surface 1303 defines a one or more grooves 1305 that may be sized and configured to receive a protruding ridge 1204 of the nose cone 110. In some embodiments a single groove 1305 extends continuously about the mounting surface 1303. In other embodiments, a plurality of discrete grooves 1305 are defined by mounting surface 1303.

In some embodiments annular mounting surface 1303 is a continuous surface around the circumference of the rotor 121, as shown in FIG. 13. However, in some embodiments the mounting portion 1301 is segmented into a plurality of discreet mounting portions 1301 which are spaced about the circumference of rotor 121.

The nose cone 110 of FIG. 12 may be coupled to the hub 120 of FIG. 13. To couple nose cone 110 of FIG. 12 to hub 120 of FIG. 13 and achieve a nose cone assembly 100, nose cone 110 is positioned axially forward of hub 120 with each of the one or more protruding ridges 1204 axially aligned with a respective one of the one or more grooves 1305. Nose cone 110 is then moved axially aft such that protruding ridges 1204 first contact mounting surface 1303, causing flexible flanges 1203 to deflect inwardly (i.e. toward the central axis). As nose cone 110 continues to be moved axially aft, protruding ridges 1204 engage grooves 1305, which eases the deflection of flexible flanges 1203. Once protruding ridges 1204 are engaged with grooves 1305, the axial motion of nose cone 110 is ceased. In this position flexible flanges 1203 remain deflected inward as compared to their non-engaged state shown in FIG. 12. This deflection of flexible flanges 1203 creates strain, which aides in holding nose cone 110 to hub 120.

Flexible flanges 1203 must be sized and formed of material to provide sufficient strain to allow nose cone 110 to remain coupled to hub 120 under all operating conditions. In rotating embodiments, centrifugal forces acting on flexible flange 1203 may impart additional holding force as the flexible flange 1203 is pushed radially outward and thus exerts increased force on the hub 120. Additionally, it is noted that the engagement of protruding ridges 1204 to a respective groove 1305 holds nose cone 110 in a steady circumferential position relative to the hub 120.

The radial displacement force imparted by a deflected flexible flange 1203 on hub 120 must be sufficient to withstand maximum operating loads. As with most nose cone designs, this includes the maximum loading experienced during a bird strike. The flexible flanges 1203 may be configured to impart sufficient radial displacement force such that decoupling of the nose cone 110 and hub 120 is only possible under loading from an assembly/disassembly tool. Such a tool may engage the nose cone 110 via trim balance apertures 160 in surface 112.

Figure 14A:
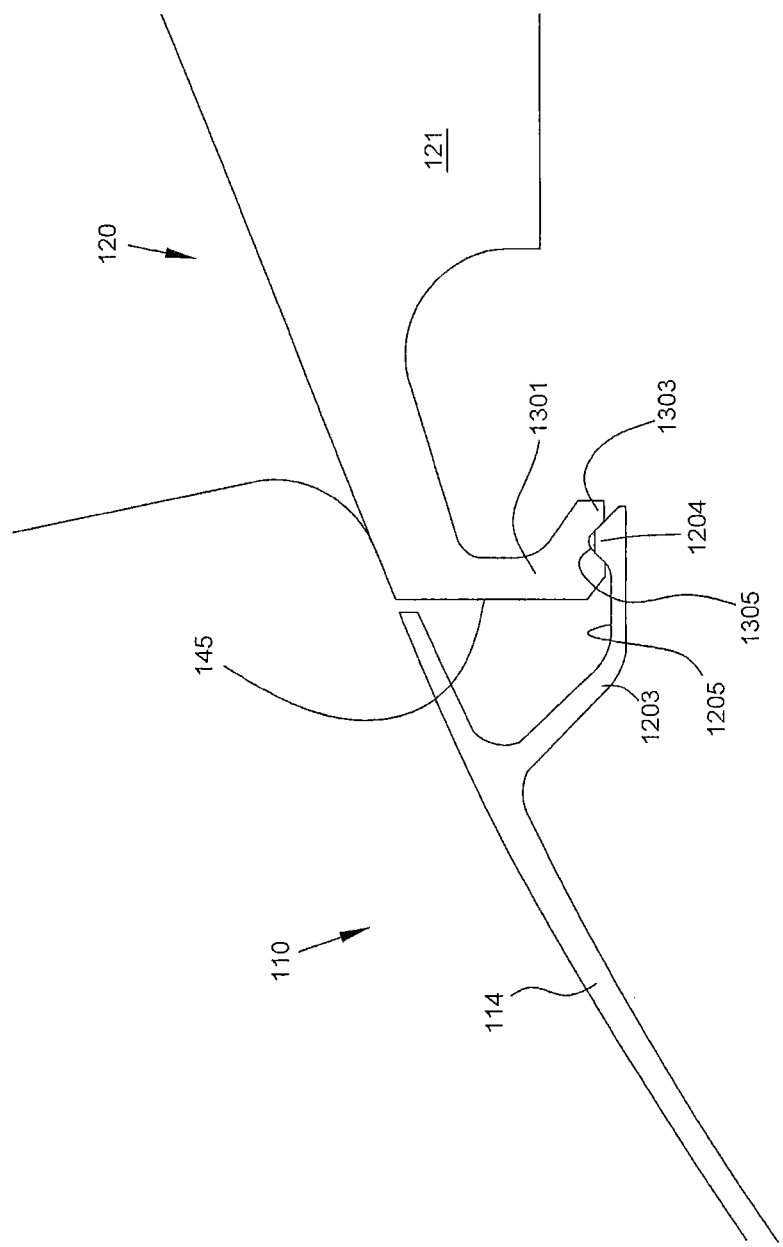
FIG. 14A is a partial sectional view of the nose cone of FIG. 12 coupled to the hub of FIG. 13, shown along a plane intersecting one of the one or more hub mounting members, in accordance with some embodiments of the present disclosure.

FIG. 14A is a partial sectional view of the nose cone 110 of FIG. 12 coupled to the hub 120 of FIG. 13, shown along a plane intersecting one of the one or more hub mounting members 1201, in accordance with some embodiments of the present disclosure. Hub mounting member 1201 comprises flexible flange 1203 and protruding ridge 1204. As shown in FIG. 14A, when nose cone 110 is properly coupled to hub 120, protruding ridge 1204 is engaged with groove 1305 and flexible flange 1203 is inwardly deflected as compared to its unengaged position in FIG. 12.

Figure 14B:
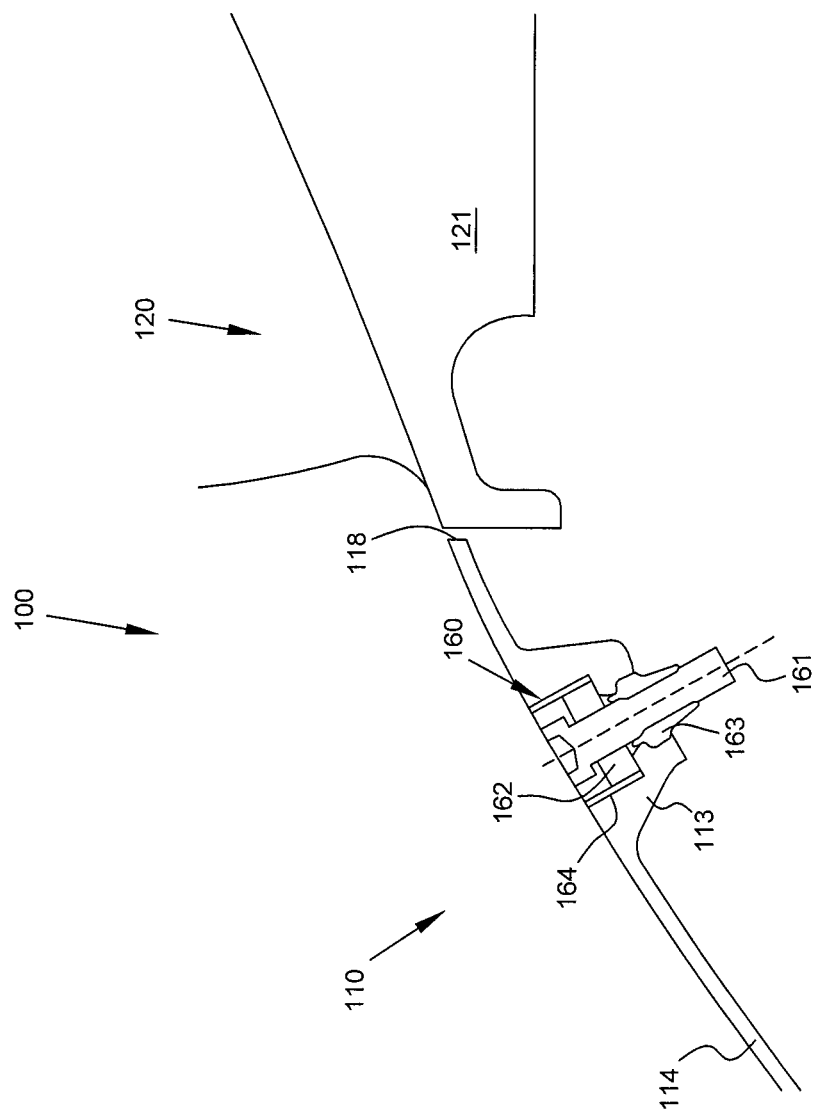
FIG. 14B is a partial sectional view of the nose cone of FIG. 12 coupled to the hub of FIG. 13, shown along a plane which does not intersect a hub mounting member but which does intersect an aperture, in accordance with some embodiments of the present disclosure.

FIG. 14B is a partial sectional view of the nose cone 110 of FIG. 12 coupled to the hub 120 of FIG. 13, shown along plane which does not intersect a hub mounting member 1201 but which does intersect an aperture 160, in accordance with some embodiments of the present disclosure. In the embodiment illustrated in FIG. 14B, an aperture 160 is provided through flange member 114 and mounting member 113 for the placement of balancing weights 162. A bolt 161 and retaining nut 163 may be used to secure the balancing weight 162 in position. During nose cone 110 balancing, balancing weights 162 of varying masses may be placed in aperture 160 to ensure an evenly distributed nose cone mass, which assists with stable rotation of the nose cone 110 during operation. In some embodiments a plurality of apertures 160 are provided in nose cone 110. In some embodiments nose cone 110 further defines a countersink 164 around the aperture 160 configured to receive the balancing weight 162.

Figure 15:
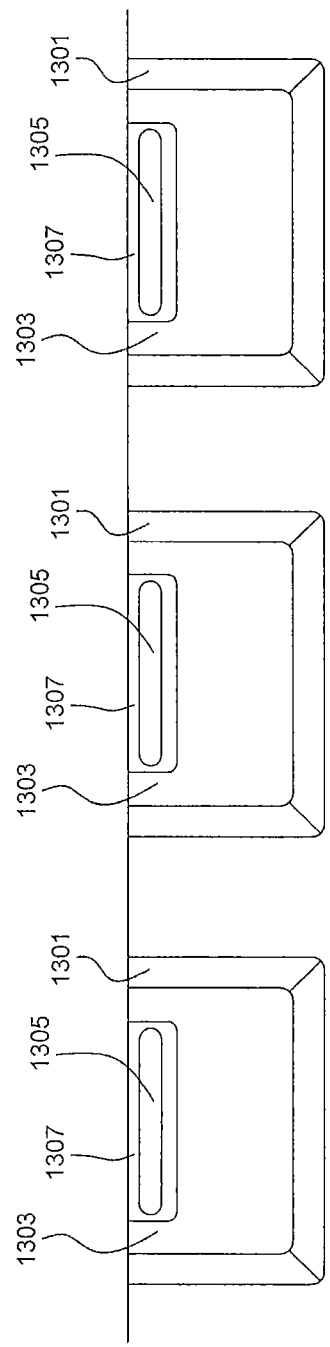
FIG. 15 is a partial profile view of the inner surface of a rotor having a plurality of discreet mounting portions in accordance with some embodiments of the present disclosure.

FIG. 15 provides a partial profile view of the inner surface of a rotor 121 having a plurality of discreet mounting portions 1301 according to some embodiments of the present disclosure. Whereas FIG. 13 illustrates a rotor 121 having a continuous mounting portion 1301 and continuous circumferential groove 1305, the embodiment illustrated in FIG. 15 shows a rotor 121 having a plurality of discrete mounting portions 1301, with each of the plurality of discrete mounting portions defining a respective groove 1305. The view provided in FIG. 15 is looking radially outward from the central axis. A plurality of mounting portions 1301 are formed on and extend inwardly from the inner surface of the rotor 121. Each mounting portion 1301 comprises a mounting surface 1303 which defines a groove 1305 configured to receive a corresponding protruding ridge 1204 of nose cone 110. In some embodiments, guide channels 1307 are provided which assist in guiding a protruding ridge 1204 to the groove 1305. Relative to the depth of groove 1305, the guide channels 1307 are shallow.

Figure 16:
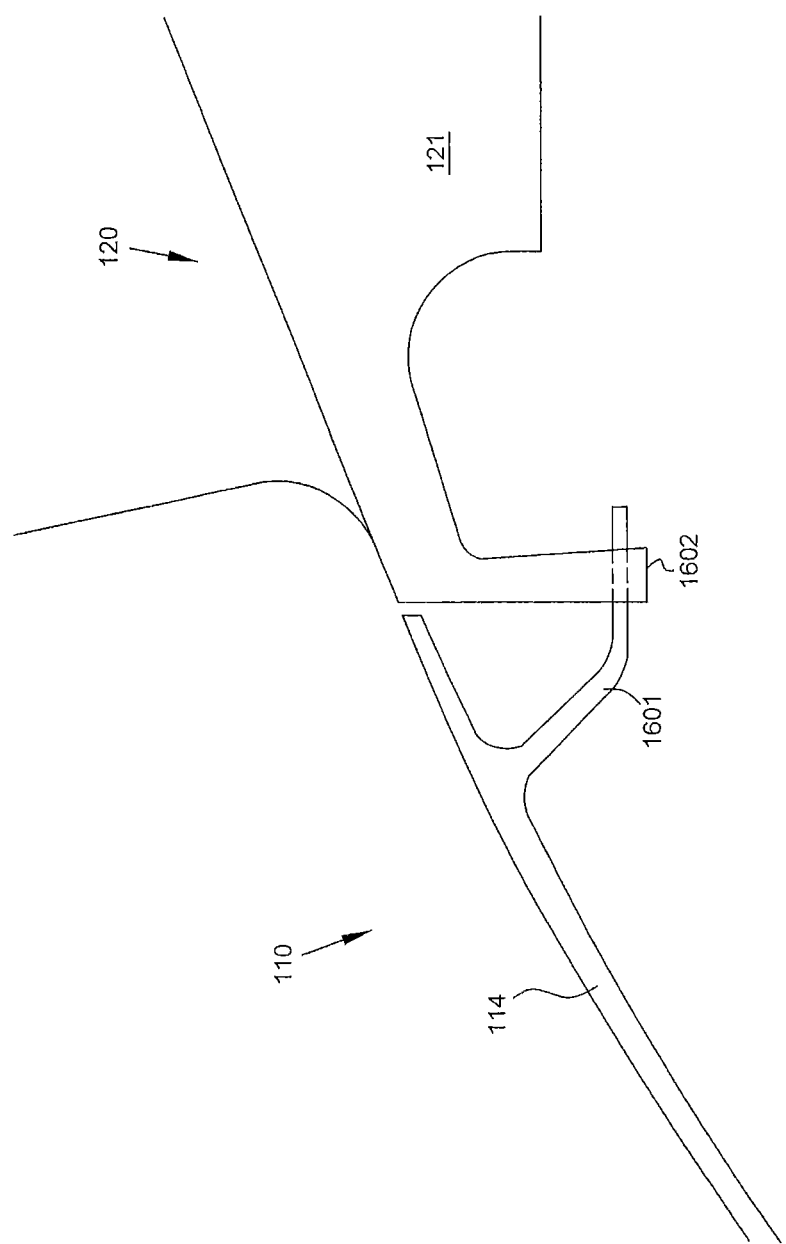
FIG. 16 is a partial sectional view of the nose cone of FIG. 12 coupled to the hub of FIG. 13 in accordance with some embodiments of the present disclosure.

In some embodiments, the nose cone 110 of FIG. 12 and the hub 120 of FIG. 13 will further include one or more circumferential alignment features. For example, in some embodiments one or more mounting flanges 901 as described above may extend forward from the hub 120 and be joined with a fastener to nose cone 110 to ensure circumferential alignment of nose cone 110 relative to hub 120. In other embodiments, such as that shown in FIG. 16, an alignment flange 1601 may extend aft from the nose cone 110 and be disposed, when nose cone 110 is coupled to hub 120, in or between an alignment tab 1602 of the hub 120.

Assembly of nose cone 110 to hub 120 may require special tooling. For example, in some embodiments where nose cone 110 defines a plurality of apertures 160, it may be desirable to secure positioning rods in one or more of the apertures 160 to assist with positioning and moving the nose cone 110 relative to hub 120. In some embodiments an annular tool is contemplated which would engage simultaneously each of the one or more positioning rods disposed in apertures 160 to apply equal pressure around the nose cone 110.

The nose cone and nose cone assemblies presented herein provide several advantages over the prior art. First, by coupling the nose cone directly a hub such as a bladed rotor of a turbine machine, it is possible to eliminate the standard support or retaining ring and thus reduce the overall weight of the unit. Second, the disclosed nose cone allows for coupling to the hub with a greatly reduced number of bolts or no bolts at all. Thus, by reducing or eliminating the bolts used in the prior art to couple the nose cone to the hub, the weight of the unit and the complexity of the coupling process are each reduced.

In certain of the above embodiments, a system for coupling a nose cone to a hub is provided which eliminates the need for fingers or flanges extending axially forward from the hub. Since these fingers or flanges are difficult to manufacture with sufficient strength tolerances, their elimination is advantageous over prior art designs.

Although examples are illustrated and described herein, embodiments are nevertheless not limited to the details shown, since various modifications and structural changes may be made therein by those of ordinary skill within the scope and range of equivalents of the claims.

What is claimed is:

1. A nose cone configured to be mounted to a hub in a turbo machine, said nose cone comprising:
   a flange extending radially around a central axis and axially from an apex portion of said nose cone to a base portion of said nose cone, said flange forming an annular hub mating surface at said base portion and having an outer surface defining an air flow path; and
   a plurality of hub mounting elements comprising:
     one or more bayonet flanges disposed around the circumference of said base portion, each of said bayonet flanges being positioned inward from said hub mating surface and foil ling a hub engaging surface parallel to and facing in the opposite direction as said hub mating surface;
     two or more apertures defined by said flange forming said annular hub mating surface, each of said apertures configured to receive a fastener therethrough and a balance weight, wherein the fastener secures the balance weight in position; and
     one or more spring flanges disposed around the circumference of said base portion, each of said spring flanges forming a hub engaging surface parallel to and facing in the same direction as said hub mating surface.

2. The nose cone of claim 1 further comprising one or more pilot flanges disposed around the circumference of said base portion, each of said pilot flanges forming a hub engaging surface perpendicular to said hub mating surface.

3. The nose cone of claim 2 comprising an annular mounting member extending radially inward from said flange proximate said hub mating surface, said bayonet flanges and said pilot flanges extending axially from said mounting member.

4. The nose cone of claim 3 wherein each of said two or more apertures include a countersink configured to receive the balance weight.

5. The nose cone of claim 4 wherein each of said two or more apertures pass through said annular mounting member.

6. The nose cone of claim 1 wherein each hub engaging surface of said one or more bayonet flanges comprises a tapered surface.

7. The nose cone of claim 6 wherein said tapered surface comprises a parabolic taper.

8. The nose cone of claim 1 wherein said flange forming an annular hub mating surface defines a plurality of apertures each configured to receive a balancing weight and balancing weight fastener therein.

9. The nose cone of claim 1 wherein said flange extending radially around the central axis forms a parabolic outer surface of the nose cone.

10. The nose cone of claim 1 wherein said flange extending radially around the central axis forms a frustoconical outer surface of the nose cone.

11. A nose cone assembly in a turbo machine, said assembly comprising:
    a turbo machine component comprising an annular hub extending radially around a central axis and forming a planar mounting surface, said hub comprising:
      one or more bayonet retainers disposed around the circumference of said hub, said bayonet retainers extending radially inward from said hub and forming an engagement surface parallel to and facing the opposite direction as said planar mounting surface;
      two or more mounting flanges disposed around the circumference of said hub, each of said mounting flanges extending axially forward from said planar mounting surface and defining an aperture configured to receive a fastener;
      one or more pilot guides disposed around the circumference of said hub, said pilot guides extending radially inward from said hub and forming an engagement surface perpendicular to said planar mounting surface; and
      one or more spring flange mating surfaces disposed around the circumference of said hub, said spring flange mating surfaces extending radially inward from said hub;
    and
    a nose cone mounted on said hub, said nose cone comprising a flange extending radially around the central axis and axially from an apex portion of said nose cone to a base portion of said nose cone, said flange forming an annular hub mating surface at said base portion and having an outer surface defining an air flow path; and
    a plurality of hub mounting elements comprising:
      one or more bayonet flanges disposed around the circumference of said base portion, each of said bayonet flanges being positioned radially inward from said hub mating surface and forming a hub engaging surface parallel to and facing in the opposite direction as said hub mating surface and being engaged with a respective engagement surface of a bayonet retainer disposed on said hub;
      two or more apertures defined by said flange fainting said annular hub mating surface, each of said apertures configured to receive a fastener therethrough and a balance weight, wherein the fastener secures the balance weight in position, and wherein each of said apertures is engaged with said aperture of a respective one of said mounting flanges by said fastener;

one or more pilot flanges disposed around the circumference of said base portion, each of said pilot flanges forming a hub engaging surface perpendicular to said hub mating surface and being engaged with a respective engagement surface of a pilot guide disposed on said hub; and one or more spring flanges disposed around the circumference of said base portion, each of said spring flanges forming a hub engaging surface parallel to and facing in the same direction as said hub mating surface and being engaged with a respective engagement surface of a spring flange mating surface disposed on said hub.

12. The nose cone assembly of claim 11 further comprising two or more fasteners, each fastener secured through a respective one of said two or more apertures defined by said flange forming said annular hub mating surface and of a respective one of said aperture defined by said two or more mounting flanges.

13. The nose cone assembly of claim 12 wherein said two or more apertures defined by said flange forming said annular hub mating surface each include a countersink configured to receive the balance weight.

14. The nose cone assembly of claim 11 wherein each of said one or more pilot guides define an aperture configured to receive a balancing weight.

15. The nose cone assembly of claim 14 further comprising a balancing weight secured to said pilot guide by a fastener.

16. The nose cone of claim 11 further comprising an annular mounting member extending radially inward from the nose cone flange proximate said hub mating surface, said bayonet flanges and said pilot flanges extending axially from said mounting member.

17. The nose cone of claim 11 wherein said hub comprises a plurality of blades extending radially outward from a rotor.

18. A method of coupling a nose cone to a hub in a turbo machine having a central axis, said nose cone comprising a flange extending radially around a central axis and axially from an apex portion of said nose cone to a base portion of said nose cone, said flange having an outer surface defining an air flow path, and a plurality of hub mounting elements disposed around a circumference of the nose cone base, said hub mounting elements including one or more bayonet flanges, one or more pilot flanges, and one or more spring flanges, said nose cone defining two or more nose cone apertures proximate the nose cone base and along the outer surface of said flange; and said hub comprising a plurality of nose cone retention elements disposed proximate a planar mounting surface, said plurality of nose cone retention elements comprising one or more bayonet retainers, one or more pilot guides, one or more spring flange mating surfaces, and two or more mounting flanges each defining a respective mounting flange aperture;

wherein said method comprises:

positioning said nose cone axially forward of and concentric with said hub;

moving said nose cone in an axially aft direction until at least a portion of the one or more bayonet flanges is disposed axially aft of a respective one or more bayonet retainers; and rotating said nose cone to engage said one or more bayonet flange and a respective bayonet retainer, to engage said one or more spring flanges and a respective spring flange mating surface, and to align each of said two or more apertures defined by the nose cone proximate the nose cone base and along the outer surface of said flange with a respective one of said two or more mounting flange apertures defined by said mounting flange.

19. The method of claim 18 further comprising securing said nose cone to said hub by securing a fastener through one of said nose cone apertures and a corresponding one of said mounting flange apertures.

20. The method of claim 19 wherein the step of rotating said nose cone further engages said one or more pilot flanges and a respective pilot guide.

* * * * *

UNITED STATES PATENT AND TRADEMARK OFFICE
CERTIFICATE OF CORRECTION

PATENT NO. : 10,344,672 B2
APPLICATION NO. : 15/342486
DATED : July 9, 2019
INVENTOR(S) : Matthew A. Scott Page 1 of 1

It is certified that error appears in the above-identified patent and that said Letters Patent is hereby corrected as shown below:

In the Claims

Column 19, Claim 1, Line 49 should read:
hub mating surface and forming a hub engaging Column 20, Claim 11, Line 64 should read:
two or more apertures defined by said flange forming Signed and Sealed this
Third Day of September, 2019

Andrei Iancu
*Director of the United States Patent and Trademark Office*